US010750327B2

(12) United States Patent
Patel et al.

(10) Patent No.: US 10,750,327 B2
(45) Date of Patent: Aug. 18, 2020

(54) METHOD FOR MULTIPLEXING MEDIA STREAMS TO OPTIMIZE NETWORK RESOURCE USAGE FOR PUSH-TO-TALK-OVER-CELLULAR SERVICE

(71) Applicant: Kodiak Networks Inc., Plano, TX (US)

(72) Inventors: Krishnakant M. Patel, Richardson, TX (US); Ramu Kandula, Plano, TX (US); Brahmananda R. Vempati, Dallas, TX (US); Harisha M. Negalaguli, Richardson, TX (US); Bharat Ram Setti Nagaswamy Srinivasan, Plano, TX (US)

(73) Assignee: KODIAK NETWORKS INC, Plano, TX (US)

(*) Notice: Subject to any disclaimer, the term of this patent is extended or adjusted under 35 U.S.C. 154(b) by 52 days.

(21) Appl. No.: 15/585,729

(22) Filed: May 3, 2017

(65) Prior Publication Data
US 2017/0238152 A1    Aug. 17, 2017

Related U.S. Application Data

(63) Continuation of application No. PCT/US2015/058880, filed on Nov. 3, 2015.
(Continued)

(51) Int. Cl.
*H04W 4/10*    (2009.01)
*H04W 76/00*    (2018.01)
(Continued)

(52) U.S. Cl.
CPC .......... *H04W 4/10* (2013.01); *H04L 65/1006* (2013.01); *H04L 65/1069* (2013.01);
(Continued)

(58) Field of Classification Search
CPC .. H04W 4/10; H04W 76/005; H04L 65/1069; H04L 65/608; H04L 69/22; H04L 65/4061
See application file for complete search history.

(56) References Cited

U.S. PATENT DOCUMENTS 3,912,874 A    10/1975 Botterell et al.
4,796,293 A    1/1989 Blinken et al.
(Continued)

FOREIGN PATENT DOCUMENTS

EP    1569473 B1    2/2009
GB    2338150 A    3/1998
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.
(Continued)

*Primary Examiner* — Jamal Javaid
*Assistant Examiner* — Thad N Defauw

(57) ABSTRACT

A system and method for multiplexing data streams in order to optimize network resources for Push-to-talk-over-Cellular (PoC) systems. One or more servers interface to the wireless communications network to perform advanced voice services for one or more mobile units therein, which include a Push-to-Talk-over-Cellular (PoC) call session. Both the servers and the mobile units that use the advanced voice services communicate with each other using control messages within the wireless communications network, and at least one of the servers switches media streams comprised of voice messages for the advanced voice services between the mobile units across the wireless communications net-
(Continued)

work. At least one of the mobile units is a participant in a plurality of PoC call sessions concurrently, and at least the media streams for each of the plurality of the PoC call sessions are multiplexed into a single path.

18 Claims, 11 Drawing Sheets

Related U.S. Application Data

(60) Provisional application No. 62/111,409, filed on Feb. 3, 2015, provisional application No. 62/074,472, filed on Nov. 3, 2014.

(51) Int. Cl.
*H04L 29/06* (2006.01)
*H04W 76/45* (2018.01)

(52) U.S. Cl.
CPC ........ *H04L 65/4061* (2013.01); *H04L 65/608* (2013.01); *H04W 76/45* (2018.02)

(56) References Cited

U.S. PATENT DOCUMENTS

| | | | |
|---|---|---|---|
| 5,353,328 A | 10/1994 | Jokimies |
| 5,442,809 A | 8/1995 | Diaz et al. |
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, III et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 6/2006 | Chaturvedi et al. |
| 7,082,316 B2 | 7/2006 | Elden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,330,540 B2 | 2/2008 | Darby et al. |
| 7,366,535 B2 | 4/2008 | Glass et al. |
| 7,403,775 B2 | 7/2008 | Patel et al. |
| 7,460,861 B2 | 12/2008 | Zabawskj |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 8,036,692 B2 | 10/2011 | Ayyasamy et al. |
| 8,244,252 B2 | 8/2012 | Descombes |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153339 A1 | 8/2003 | Crockett et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0121760 A1 | 6/2004 | Wetman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0076234 A1* | 4/2005 | Krtolica ............ H04L 63/0236 726/4 |
| 2005/0101308 A1 | 5/2005 | Lee |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |
| 2006/0128411 A1 | 6/2006 | Turcanu |
| 2006/0178138 A1 | 8/2006 | Ostroff et al. |
| 2006/0189337 A1 | 8/2006 | Farrill et al. |

(56) References Cited

U.S. PATENT DOCUMENTS

| | | |
|---|---|---|
| 2006/0198334 A1 | 9/2006 | Civanlar et al. |
| 2006/0229090 A1 | 10/2006 | Ladue |
| 2006/0234687 A1 | 10/2006 | Patel et al. |
| 2007/0016828 A1 | 1/2007 | Luo et al. |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0099609 A1 | 5/2007 | Cai |
| 2007/0133757 A1 | 6/2007 | Girouard et al. |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0239885 A1* | 10/2007 | Vadlakonda ........ H04L 12/1827 709/232 |
| 2007/0253347 A1 | 11/2007 | Patel et al. |
| 2007/0280256 A1* | 12/2007 | Forslow ................ H04W 4/10 370/395.2 |
| 2007/0288777 A1* | 12/2007 | Schutte ................ G06F 1/206 713/320 |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0299953 A1 | 12/2008 | Rao |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0325540 A1 | 12/2009 | Yach et al. |
| 2010/0034201 A1* | 2/2010 | Barave ................ H04L 12/1822 370/389 |
| 2010/0035593 A1 | 2/2010 | Fanco et al. |
| 2010/0040050 A1 | 2/2010 | Johnston |
| 2010/0082864 A1* | 4/2010 | Sumou ................ G06F 13/4286 710/111 |
| 2010/0142414 A1 | 6/2010 | Patel et al. |
| 2010/0144363 A1* | 6/2010 | De Rosa ........... H04W 72/0486 455/452.1 |
| 2010/0190492 A1 | 7/2010 | Jiang |
| 2010/0234018 A1 | 9/2010 | Lawler et al. |
| 2010/0323742 A1 | 12/2010 | Allen et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0170501 A1* | 7/2012 | Drozt .................. H04W 72/005 370/312 |
| 2013/0155872 A1 | 6/2013 | Ayyasamy et al. |
| 2013/0155875 A1 | 6/2013 | Ayyasamy et al. |
| 2013/0196706 A1 | 8/2013 | Patel et al. |
| 2013/0315164 A1 | 11/2013 | Arur et al. |
| 2013/0337859 A1 | 12/2013 | Patel et al. |
| 2014/0113672 A1 | 4/2014 | Lindner et al. |
| 2014/0118473 A1* | 5/2014 | Halavy .................. H04N 7/152 348/14.09 |
| 2014/0148210 A1 | 5/2014 | Kundu et al. |
| 2014/0270769 A1* | 9/2014 | Nazarathy ............... H04J 14/06 398/65 |
| 2014/0280553 A1* | 9/2014 | Hernandez ............. H04L 67/22 709/204 |
| 2015/0029918 A1* | 1/2015 | Bangolae ................ H04W 4/70 370/311 |

FOREIGN PATENT DOCUMENTS

| | | |
|---|---|---|
| JP | 200392776 A | 10/2004 |
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |

OTHER PUBLICATIONS

Nokia: "What is TETRA? Why Nokia TETRA?", The Nokia TETRA Primer, 2002, pp. 1-29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", trackwell.com, Oct. 2002, pp. 1-1.

\* cited by examiner

METHOD FOR MULTIPLEXING MEDIA STREAMS TO OPTIMIZE NETWORK RESOURCE USAGE FOR PUSH-TO-TALK-OVER-CELLULAR SERVICE

CROSS-REFERENCE TO RELATED APPLICATIONS

This application is a continuation of International Patent Application No. PCT/US2015/058880, filed on Nov. 3, 2015, which claims the benefit under 35 U.S.C. Section 119(e) of the following co-pending and commonly-assigned patent application:

U.S. Provisional Application Ser. No. 62/074,472, filed on Nov. 3, 2014, by Krishnakant M. Patel, Ramu Kandula, Brahmananda R. Vempati, Harisha Mahabaleshwara Negalaguli, and Bharat Ram Setti Nagaswamy Srinivasan, entitled "METHOD FOR MULTIPLEXING RTP STREAMS AND ITS APPLICATION TO OPTIMIZE NETWORK RESOURCE USAGE FOR POC SERVICE,"; and U.S. Provisional Application Ser. No. 62/111,409, filed on Feb. 3, 2015, by Krishnakant M. Patel, Ramu Kandula, Brahmananda R. Vempati, Harisha Mahabaleshwara Negalaguli, and Bharat Ram Setti Nagaswamy Srinivasan, entitled "METHOD FOR MULTIPLEXING RTP STREAMS AND ITS APPLICATION TO OPTIMIZE NETWORK RESOURCE USAGE FOR POC SERVICE,";

which applications are incorporated by reference herein.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," now U.S. Pat. No. 7,787,896, issued Aug. 31, 2010, which application claims the benefit under 35 U.S.C. Section 365 of P.C.T. International Application Serial Number PCT/US03/16386 (154.4-WO-U1), which application claims the benefit under 35 U.S.C. Section 119(e) of U.S. Provisional Application Ser. No. 60/382,981 (154.3-US-P1), 60/383,179 (154.4-US-P1) and 60/407,168 (154.5-US-P1);

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038 (154.7-WO-U1), which application claims the benefit under 35 U.S.C. Section 119(e) of U.S. Provisional Application Ser. No. 60/488,638 (154.7-US-P1), 60/492,650 (154.8-US-P1) and 60/576,094 (154.14-US-P1) and which application is a continuation-in-part and claims the benefit under 35 U.S.C. Sections 119, 120 and/or 365 of P.C.T. International Application Serial Number PCT/US03/16386 (154.4-WO-U1);

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. No. 60/569,953 (154.9-US-P1) and 60/579,309 (154.15-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075 (154.10-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," now U.S. Pat. No. 7,764,950, issued Jul. 27, 2010, which application claims the benefit under 35 U.S.C. Section 119(e) of U.S. Provisional Application Ser. No. 60/573,059 (154.11-US-P1) and 60/576,092 (154.12-US-P1), and which application is a continuation-in-part and claims the benefit under 35 U.S.C. Sections 119, 120 and/or 365 of U.S. Utility application Ser. No. 10/515,556 (154.4-US-WO), P.C.T. International Application Serial Number PCT/US04/23038 (154.7-WO-U1), U.S. Utility application Ser. No. 11/126,587 (154.9-US-U1), and U.S. Utility application Ser. No. 11/129,268 (154.10-US-U1);

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," now U.S. Pat. No. 7,738,896, issued Jun. 15, 2010, which application claims the benefit under 35 U.S.C. Section 119(e) of U.S. Provisional Application Ser. No. 60/573,780 (154.13-US-P1), and which application is a continuation-in-part and claims the benefit under 35 U.S.C. Sections 119, 120 and/or 365 of U.S. Utility application Ser. No. 10/515,556 (154.4-US-WO), P.C.T. International Application Serial Number PCT/US04/23038 (154.7-WO-U1), U.S. Utility application Ser. No. 11/126,587 (154.9-US-U1), and U.S. Utility application Ser. No. 11/134,883 (154.11-US-U1);

U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/581,954 (154.16-US-P1), and which application is a continuation-in-part and claims the benefit under 35 U.S.C. Sections 119, 120 and/or 365 of U.S. Utility application Ser. No. 10/515,556 (154.4-US-WO) and P.C.T. International Application Serial Number PCT/US04/23038 (154.7-WO-U1);

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Application Ser. No. 60/588,464 (154.17-US-P1);

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271 (154.18-US-P1);

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424 (154.19-US-P1);

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS now U.S. Pat. No. 7,689,238, issued Mar. 30, 2010, which application claims the benefit under 35 U.S.C. Section 119(e) of U.S. Provisional Application Ser. No. 60/705,115 (154.20-US-P1);

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265 (154.21-US-P1);

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250 (154.23-US-P1);

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090 (154.26-US-P1);

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521 (154.27-US-P1);

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. No. 60/982,650 (154.32-US-P1) and 61/023,042 (154.32-US-P2);

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," now U.S. Pat. No. 8,676,189, issued Mar. 18, 2014, which application claims the benefit under 35 U.S.C. Section 119(e) of U.S. Provisional Application Ser. No. 61/023,332 (154.33-US-P1);

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," now U.S. Pat. No. 8,958,348, issued Feb. 17, 2015, which application claims the benefit under 35 U.S.C. Section 119(e) of U.S. Provisional Application Ser. No. 61/106,689 (154.36-US-P1);

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION," now U.S. Pat. No. 8,670,760, issued Mar. 11, 2014, which application is a continuation-in-part and claims the benefit under 35 U.S.C. Sections 119, 120 and/or 365 of U.S. Utility application Ser. No. 12/582,601 (154.36-US-U1);

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK," now U.S. Pat. No. 8,498,660, issued Jul. 30, 2013, which application claims the benefit under 35 U.S.C. Section 119(e) of U.S. Provisional Application Ser. No. 61/164,754 (154.39-US-P1) and 61/172,129 (154.39-US-P2);

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," which application claims the benefit under 35 U.S.C. Section 119(e) of U.S. Provisional Application Ser. No. 61/266,896 (154.40-US-P1);

U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK," now U.S. Pat. No. 8,369,829, issued Feb. 5, 2013, which application claims the benefit under 35 U.S.C. Section 119(e) of U.S. Provisional Application Ser. No. 61/310,245 (154.41-US-P1);

U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (PoC) CALL SETUP OPTIMIZATIONS," now U.S. Pat. No. 8,478,261, issued Jul. 2, 2013, which application claims the benefit under 35 U.S.C. Section 119(e) of U.S. Provisional Application Ser. No. 61/347,217 (154.42-US-P1);

U.S. Utility application Ser. No. 13/710,683, filed Dec. 11, 2012, by Ravi Ayyasamy, Gorachand Kundu, Krishnakant M. Patel, Brahmananda R. Vempati, Harisha M. Negalaguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC)," which application claims the benefit under 35 U.S.C. Section 119(e) of U.S. Provisional Application Ser. No. 61/570,694 (154.43-US-P2);

U.S. Utility application Ser. No. 13/917,561, filed Jun. 13, 2013, by Krishnakant M. Patel, Brahmananda R. Vempati, Anand Narayanan, Gregory J. Morton, and Ravi Ayyasamy, entitled "RUGGEDIZED CASE OR SLEEVE FOR PROVIDING PUSH-TO-TALK (PTT) FUNCTIONS," which application claims the benefit under 35 U.S.C. Section 119(e) of U.S. Provisional Application Ser. No. 61/659,292 (154.47-US-P1); U.S. Provisional Application Ser. No. 61/682,524 (154.47-US-P2); and U.S. Provisional Application Ser. No. 61/705,748 (154.47-US-P3);

U.S. Utility application Ser. No. 13/757,520, filed Feb. 1, 2013, by Krishnakant M. Patel, Harisha Mahabaleshwara Negalaguli, Brahmananda R. Vempati, Shiva Koteshwara Kiran Cheedella, Arun Velayudhan, Raajeev Kuppa, Gorachand Kundu, Ravi Ganesh Ramamoorthy, Ramu Kandula, Ravi Ayyasamy, and Ravi Shankar Kumar, entitled "WiFi INTERWORKING SOLUTIONS FOR PUSH-TO-TALK-OVER-CELLULAR (PoC)," now U.S. Pat. No. 9,088,876, issued Jul. 21, 2015, which application claims the benefit under 35 U.S.C. Section 119(e) of U.S. Provisional Application Ser. No. 61/593,485 (154.48-US-P1);

U.S. Utility application Ser. No. 14/093,240, filed Nov. 29, 2013, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE," now U.S. Pat. No. 9,137,646, issued Sep. 15, 2015, which application claims the benefit under 35 U.S.C. Section 119(e) of U.S. Provisional Application Ser. No. 61/730,856 (154.55-US-P1);

P.C.T. International Application Serial Number PCT/US2014/036414, filed May 1, 2014, by Krishnakant M. Patel, Harisha Mahabaleshwara Negalaguli, Arun Velayudhan, Ramu Kandula, Syed Nazir Khadar, Shiva Koteshwara Kiran Cheedella, and Subramanyam Narasimha Prashanth, entitled "VOICE-OVER-IP (VOIP) DENIAL OF SERVICE (DOS) PROTECTION MECHANISMS FROM ATTACK," which application claims the benefit under 35 U.S.C. Section 119(e) of U.S. Provisional Application Ser. No. 61/818,109 (154.56-US-P1); and U.S. Provisional Application Ser. No. 61/821,975 (154.56-US-P2);

U.S. Utility application Ser. No. 14/286,427, filed May 23, 2014, by Krishnakant M. Patel, Ravi Ayyasamy and Brahmananda R. Vempati, entitled "METHOD TO ACHIEVE A FULLY ACKNOWLEDGED MODE COMMUNICATION IN PUSH-TO-TALK OVER CELLULAR (PoC)," which application claims the benefit under 35 U.S.C. Section 119(e) of U.S. Provisional Application Ser. No. 61/826,895 (154.57-US-P1);

P.C.T. International Application Serial Number PCT/US2014/047863, filed on Jul. 23, 2014, by Gorachand Kundu, Giridhar K. Boray, Brahmananda R. Vempati, Krishnakant M. Patel, Ravi Ayyasamy, and Harisha M. Negalaguli, entitled "EFFECTIVE PRESENCE FOR PUSH-TO-TALK-OVER-CELLULAR (PoC) NETWORKS," which application claims the benefit under 35 U.S.C. Section 119(e) of U.S. Provisional Application Ser. No. 61/857,363 (154.58-US-P1); and U.S. Provisional Application Ser. No. 61/944,168 (154.58-US-P2);

P.C.T. International Application Serial Number PCT/US15/10617, filed Jan. 8, 2015, by Krishnakant M. Patel, Brahmananda R. Vempati, and Harisha Mahabaleshwara Negalaguli, entitled "OPTIMIZED METHODS FOR LARGE GROUP CALLING USING UNICAST AND MULTICAST TRANSPORT BEARER FOR PUSH-TO-TALK-OVER-CELLULAR (PoC)," which application claims the benefit under 35 U.S.C. Section 119(e) of U.S. Provisional Application Ser. No. 61/924,897 (154.59-US-P1);

U.S. Utility application Ser. No. 14/639,794, filed Mar. 5, 2015, by Krishnakant M. Patel, Brahmananda R. Vempati, Ravi Ayyasamy, and Bibhudatta Biswal, entitled "PUSH-TO-TALK-OVER-CELLULAR (POC) SERVICE IN HETEROGENEOUS NETWORKS (HETNETS) AND MULTI-MODE SMALL CELL ENVIRONMENTS," which application claims the benefit under 35 U.S.C. Section 119(e) of U.S. Provisional Application Ser. No. 61/948,429 (154.60-US-P1);

P.C.T. International Application Serial Number PCT/US2014/047886, filed on Jul. 23, 2014, by Gorachand Kundu, Giridhar K. Boray, Brahmananda R. Vempati, Krishnakant M. Patel, Ravi Ayyasamy, Harisha Mahabaleshwara Negalaguli, and Ramu Kandula, entitled "RADIO ACCESS NETWORK (RAN) AWARE SERVICE DELIVERY FOR PUSH-TO-TALK-OVER-CELLULAR (PoC) NETWORKS," which application is a continuation-in-part under 35 U.S.C. Section 120 of P.C.T. International Application Serial Number PCT/US2014/047863 (154.58-US-U1);

P.C.T. International Application Serial Number PCT/US2015/45951, filed on Aug. 19, 2015, by Krishnakant M. Patel, Brahmananda R. Vempati, and Harisha Mahabaleshwara Negalaguli, entitled "RELAY-MODE AND DIRECT-MODE OPERATIONS FOR PUSH-TO-TALK-OVER-CELLULAR (PoC) USING WIFI TECHNOLOGIES," which application claims the benefit under 35 U.S.C. Section 119(e) of U.S. Provisional Application Ser. No. 62/039,272 (154.62-US-P1);

P.C.T. International Application Serial Number PCT/US2015/56712, filed on Oct. 21, 2015, by Krishnakant M. Patel, Ramu Kandula, Brahmananda R. Vempati, Pravat Kumar Singh, and Harisha Mahabaleshwara Negalaguli, entitled "SYSTEM FOR INTER-COMMUNICATION BETWEEN LAND MOBILE RADIO AND PUSH-TO-TALK-OVER-CELLULAR SYSTEMS," which application claims the benefit under 35 U.S.C. Section 119(e) of U.S. Provisional Application Ser. No. 62/066,533 (154.63-US-P1);

P.C.T. International Application Serial Number PCT/US2015/xxxxxx, filed on Oct. 29, 2015, by Krishnakant M. Patel, Brahmananda R. Vempati, Bibhudatta Biswal, Ravi Ayyasamy, Harisha Mahabaleshwara Negalaguli, and Ramu Kandula, entitled "METHODS TO LEVERAGE WEB REAL-TIME COMMUNICATION FOR IMPLEMENTING PUSH-TO-TALK SOLUTIONS," which application claims the benefit under 35 U.S.C. Section 119(e) of U.S. Provisional Application Ser. No. 62/072,135 (154.64-US-P1) and 62/117,575 (154.64-US-P2);

P.C.T. International Application Serial Number PCT/US2015/xxxxxx, filed on Nov. 3, 2015, by Harisha Mahabaleshwara Negalaguli, Krishnakant M. Patel, Brahmananda R. Vempati and Ramu Kandula, entitled "METHOD FOR PROVIDING DYNAMIC QUALITY OF SERVICE FOR PUSH-TO-TALK SERVICE," which application claims the benefit under 35 U.S.C. Section 119(e) of U.S. Provisional Application Ser. No. 62/074,386 (154.65-US-P1);

P.C.T. International Application Serial Number PCT/US2015/xxxxxx, filed on Nov. 3, 2015, by Krishnakant M. Patel, Brahmananda R. Vempati, Harisha Mahabaleshwara Negalaguli, and Ramu Kandula, entitled "ARCHITECTURE FRAMEWORK TO REALIZE PUSH-TO-X SERVICES USING CLOUD-BASED STORAGE SERVICES," which application claims the benefit under 35 U.S.C. Section 119(e) of U.S. Provisional Application Ser. No. 62/074,391 (154.66-US-P1); all of which applications are incorporated by reference herein.

BACKGROUND

1. Field of the Invention

This invention relates in general to advanced voice services in wireless communications networks, and more specifically, to a system and method for multiplexing data streams in order to optimize network resources for Push-to-talk-over-Cellular (PoC) systems.

2. Description of Related Art

Advanced voice services (AVS), also known as Advanced Group Services (AGS), such as two-way half-duplex voice calls within a group, also known as Push-to-talk-over-Cellular (PoC), Push-to-Talk (PTT), or Press-to-Talk (P2T), as well as other AVS functions, such as Push-to-Conference (P2C) or Instant Conferencing (IC), Push-to-Message (P2M), etc., are described in the co-pending and commonly-assigned patent applications cross-referenced above and incorporated by reference herein. These AVS functions have enormous revenue earnings potential for wireless communications systems, such as cellular networks, wireless data networks and IP networks.

One approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G/4G/LTE (3rd Generation/4th Generation/Long Term Evolution), etc.

Nonetheless, there is a need in the art for improvements to the methods and systems for delivering the advanced voice services, such as PoC, that comply with both existing and emerging wireless standards and yet provide superior user experiences. For example, many existing implementations of PoC do not support the multiplexing of data streams in order to optimize network resources. The present invention, on the other hand, satisfies the need for multiplexing data streams.

SUMMARY

To overcome the limitations in the prior art described above, and to overcome other limitations that will become apparent upon reading and understanding the present specification, the present invention discloses a system and method for multiplexing data streams in order to optimize network resources for Push-to-talk-over-Cellular (PoC) systems.

One or more servers interface to the wireless communications network to perform advanced voice services for one or more mobile units therein, wherein the advanced voice services include an instant two-way half-duplex voice call within a group of the mobile units comprising a Push-to-Talk-over-Cellular (PoC) call session. Both the servers and the mobile units that use the advanced voice services communicate with each other using control messages within the wireless communications network, and at least one of the servers switches media streams comprised of voice messages for the advanced voice services between the mobile units across the wireless communications network.

At least one of the mobile units is a participant in a plurality of PoC call sessions concurrently, and at least the media streams for each of the plurality of the PoC call sessions are multiplexed into a single path, wherein the single path comprises a single port.

One of the servers manages the plurality of the PoC call sessions by acting as an arbitrator for each of the plurality of the PoC call sessions and by controlling the sending of the control messages and the media streams for each of the plurality of the PoC call sessions.

The single path is assigned a unique identifier, and each of the plurality of the PoC call sessions is assigned a unique tag. The media streams are multiplexed and de-multiplexed using the unique tag assigned to each of the plurality of the PoC call sessions. The media streams may include Realtime Transport Protocol (RTP) headers, wherein the unique tag is stored in a Contributing Source (CSRC) field in the RTP header. Alternatively, the media streams may comprise RTP packets, wherein the unique tag is stored in an extension header in the RTP packets.

BRIEF DESCRIPTION OF THE DRAWINGS

Referring now to the drawings in which like reference numbers represent corresponding parts throughout.

DETAILED DESCRIPTION OF ILLUSTRATIVE EMBODIMENTS

Figure 1:
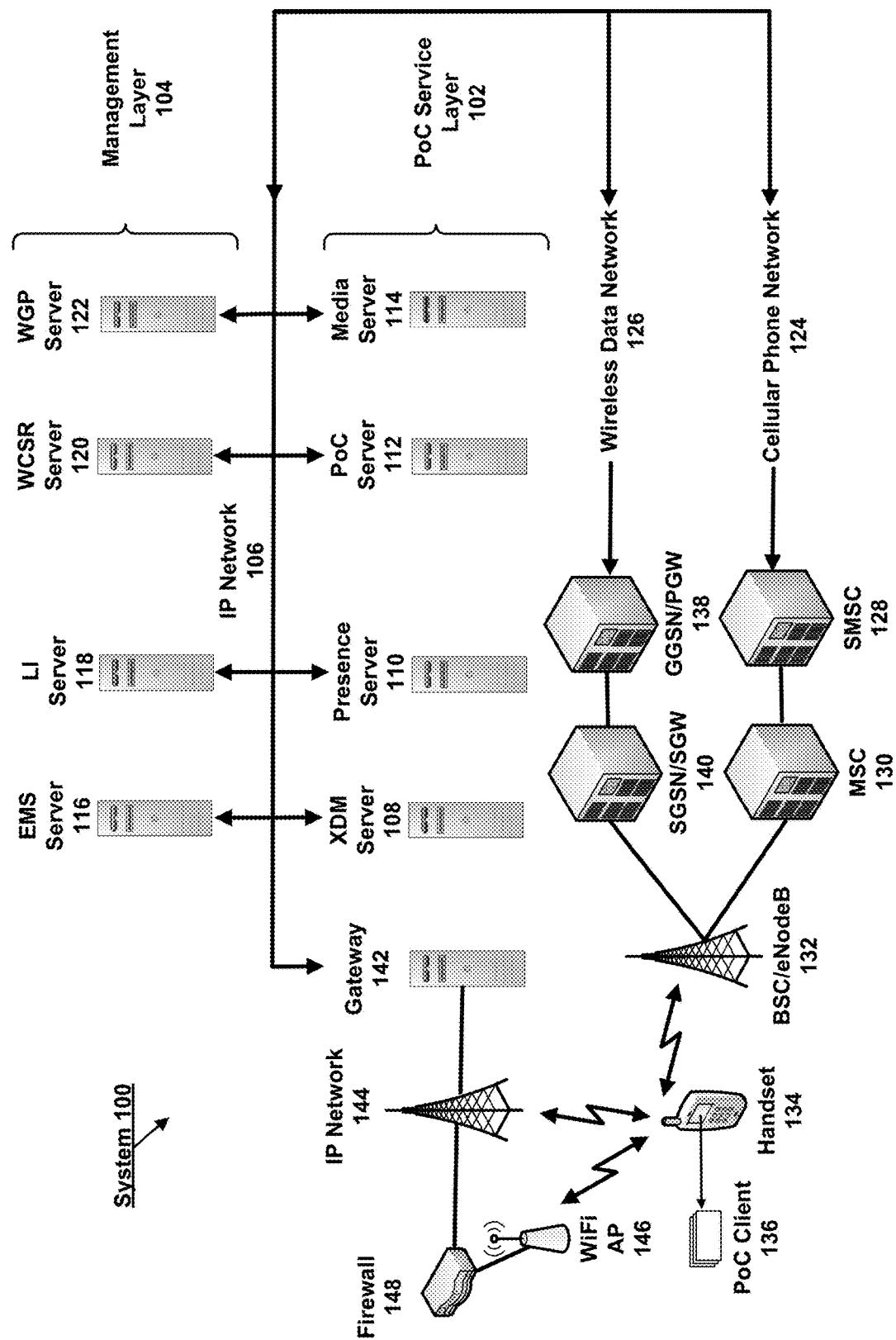
FIG. 1 illustrates the system architecture used in one embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 OVERVIEW

The present invention discloses a system for implementing advanced voice services in wireless communications networks that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure. This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| ATCA | Advanced Telecommunications Computing Architecture |
| DnD | Do not Disturb |
| DNS | Domain Name Server |
| DTLS | Datagram Transport Layer Security |
| MBMS/eMBMS | Multimedia Broadcast Multicast Services |
| GPRS | General Packet Radio Service |
| GSM | Global System for Mobile communications |
| HTTP | Hypertext Transport Protocol |
| HTTPS | Secure Hypertext Transport Protocol |
| IMSI | International Mobile Subscriber Identity |
| IP | Internet Protocol |
| IPA | Instant Personal Alert |
| MBCP | Media Burst Control Protocol |
| MCC | Mobile Country Code |
| MDN | Mobile Directory Number |
| MNC | Mobile Network Code |
| MS-ISDN | Mobile Station International Subscriber Directory Number |
| OMA | Open Mobile Alliance |
| PoC | Push-to-talk-over-Cellular |
| PGW | Packet GateWay |
| PTT | Push-To-Talk |
| RTCP | Realtime Transport Control Protocol |
| RTP | Realtime Transport Protocol |
| SDP | Session Description Protocol |
| SGW | Serving GateWay |
| SIM | Subscriber Identity Module |
| SIP | Session Initiation Protocol |
| SMMP | Short Message peer-to-peer Protocol |
| SMS | Small Message Service |
| SRTP | Secure Real-time Transport Protocol |
| SSID | Service Set Identifier |
| SSL | Secure Sockets Layer protocol |
| SSRC | Synchronization SouRCe |
| TLS | Transport layer security protocol |
| UDP | User Datagram Protocol |
| URI | Uniform Resource Identifier |
| VoIP | Voice-over-IP |
| XCAP | XML Configuration Access Protocol |
| XDM | XML Document Management |
| XML | Extensible Mark-up Language |
| 4G/LTE | $4^{th}$ Generation/Long Term Evolution |

The following table defines various terms, including industry-standard terms, that are used in this specification.

| Term | Description |
| --- | --- |
| 1-1 PoC Session | A feature enabling a PoC User to establish a PoC Session with another PoC User. |
| Ad Hoc PoC Group Session | A PoC Group Session established by a PoC User to PoC Users listed on the invitation. The list includes PoC Users or PoC Groups or both. |
| Answer Mode | A PoC Client mode of operation for the terminating PoC Session invitation handling. |
| Controlling PoC Function | A function implemented in a PoC Server, providing centralized PoC Session handling, which includes media distribution, Talk Burst Control, Media Burst Control, policy enforcement for participation in the PoC Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| Firewall | A device that acts as a barrier to prevent unauthorized or unwanted communications between computer networks and external devices. |
| Home PoC Server | The PoC Server of the PoC Service Provider that provides PoC service to the PoC User. |

-continued

| Term | Description |
| --- | --- |
| Instant Personal Alert | A feature in which a PoC User sends a SIP based instant message to a PoC User requesting a 1-1 PoC Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signalling and content of wire, oral, or electronic communications. |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC Session handling, which includes policy enforcement for incoming PoC Sessions and relays Talk Burst Control and Media Burst Control messages between the PoC Client and the PoC Server performing the Controlling PoC Function. The Participating PoC Function may also relay RTP Media between the PoC Client and the PoC Server performing the Controlling PoC Function. |
| PoC Client | A functional entity that resides on the User Equipment that supports the PoC service. |
| Pre-Arranged PoC Group Identity | A SIP URI identifying a Pre-Arranged PoC Group. A Pre-Arranged PoC Group Identity is used by the PoC Client, e.g., to establish PoC Group Sessions to the Pre-Arranged PoC Groups. |
| Pre-Arranged PoC Group | A persistent PoC Group. The establishment of a PoC Session to a Pre-Arranged PoC Group results in the members being invited. |
| Pre-Established Session | The Pre-Established Session is a SIP Session established between the PoC Client and its Home PoC Server. The PoC Client establishes the Pre-Established Session prior to making requests for PoC Sessions to other PoC Users. To establish a PoC Session based on a SIP request from the PoC User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such as "conference room #27". The Presentity is identified by a SIP URI, and may additionally be identified by a tel URI or a pres URI. |
| Public | These subscribers create and manage their contacts and groups. |
| Serving Server | A set of primary and secondary servers. |
| Subscription | The information kept by the Presence Service about a subscribed watcher's request to be notified of changes in the Presence Information of one or more Presentities. |
| Watcher | Any uniquely identifiable entity that requests Presence Information about a Presentity from the Presence Service. |
| WiFi | A wireless local area network (WLAN). |

2 SYSTEM ARCHITECTURE

FIG. 1 illustrates the system architecture used in the present invention.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 executing a PoC Client 136. A handset 134 is also referred to as a mobile unit, mobile station, mobile phone, cellular phone, etc. and may comprise any wireless and/or wired device. The wireless data network 126, depending on its type, e.g., GPRS or 4G/LTE, includes one or more Gateway GPRS Support Nodes (GGSNs) or Packet Gateways (PGWs) 138 and Serving GPRS Support Nodes (SGSNs) or Serving GateWays (SGWs) 140, which also communicate with customer handsets 134 via BSCs or eNodeBs 132.

In one embodiment of the present invention, the PoC Service Layer 102 and Management Layer 104 are connected to one or more Gateways 142, which are coupled to one or more external IP networks 144, in order to communicate with one or more PoC Clients 136 on one or more handsets 134. Traffic to and from the wireless data networks 126 may also traverse Gateways 142.

In one embodiment of the present invention, the handsets 134 may be WiFi-enabled and thus capable of communicating with local IP networks 144, which may be comprised of one or more WiFi Access Points (APs) 146, as well as other network 144 appliances such as Firewalls 148.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:
The GGSN/PGW 138 transfers IP packets between the PoC Client 136 and the various servers:
SIP/IP signaling messages between the PoC Server 112 and PoC Client 136 for control traffic exchange (i.e., control packets) for PoC call sessions.
RTP/IP, RTCP/IP and MBCP/IP packets between the Media Server 114 and PoC Client 136 for bearer traffic exchange (i.e., voice packets) for PoC call sessions.
SIP/IP signaling messages between the Presence Server 110 and PoC Client 136 for presence information.
XCAP/HTTP/IP and SIP/IP signaling between the XDM Server 108 and PoC Client 136 for document management.
The SMSC 128 handles authentication:
The XDM Server 108 communicates with the SMSC 128 via SMPP/IP for receiving the authentication code required for PoC Client 136 activation from the handset 134.

2.3 IP Network

The PoC Service Layer 102 also interacts with the following entities on the IP network 144:
The Gateway 142 transfers IP packets between the PoC Client 136 and the various servers:
SIP/IP signaling messages between the PoC Server 112 and PoC Client 136 for control traffic exchange (i.e., control packets) for PoC call sessions.
RTP/IP, RTCP/IP and MBCP/IP packets between the Media Server 114 and PoC Client 136 for bearer traffic exchange (i.e., voice packets) for PoC call sessions.
SIP/IP signaling messages between the Presence Server 110 and PoC Client 136 for presence information.
XCAP/HTTP/IP and SIP/IP signaling between the XDM Server 108 and PoC Client 136 for document management.
SIP/IP signaling messages between the XDM Server 108 and PoC Client 136 for receiving the authentication code required for PoC Client 136 activation from the handset 134.

2.4 PoC Service Layer Elements

As noted above, the PoC Service Layer 102 is comprised of the following elements:
PoC Server 112,
Media Server 114,
Presence Server 110,
XDM Server 108, and
Gateway 142.

These elements are described in more detail below.

2.4.1 PoC Server

The PoC Server 112 handles the PoC call session management and is the core for managing the PoC services for the PoC Clients 136 using SIP protocol. The PoC Server 112 implements a Control Plane portion of Controlling and Participating PoC Functions. A Controlling PoC Function acts as an arbitrator for a PoC Session and controls the sending of control and bearer traffic by the PoC Clients 136. A Participating PoC Function relays control and bearer traffic between the PoC Client 136 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC Session. The Media Server 114 also supports the Participating PoC Function by relaying the voice packets between PoC Clients 136 and the Media Server 114 supporting the Controlling PoC Function. The Media Server 114 also handles packets sent to and received from the PoC Clients 136 for floor control during PoC call sessions.

2.4.3 Presence Server

The Presence Server 110 implements a presence enabler for the PoC service. The Presence Server 110 accepts, stores and distributes Presence Information for Presentities, such as PoC Clients 136.

The Presence Server 110 also implements a Resource List Server (RLS), which accepts and manages subscriptions to Presence Lists. Presence Lists enable a "watcher" application to subscribe to the Presence Information of multiple Presentities using a single subscription transaction.

The Presence Server 110 uses certain XDM functions to provide these functions, which are provided by XDM Server 108.

2.4.4 XDM Server

The XDM Server 108 implements an XDM enabler for the PoC service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 Gateway

The Gateway 142 implements an interworking solution for the PoC service to communicate via one or more IP network 144 to the PoC Clients 136. Specifically, the Gateway 142 provides PoC service over an IP network 144 (such as an external WiFi network), as well as the wireless data networks 126, and supports a seamless user experience while the transport of IP control messages and IP voice data is transitioned between different types of wireless communications networks, such as wireless data networks 126 comprising cellular data packet networks and IP networks 144. The Gateway 142 also resolves security concerns that arise with such interworking solutions.

This is necessary because the quality, performance and availability of the wireless data networks 126 typically vary from location to location based on various factors. In addressing these issues, the interworking solution implemented by the Gateway 142 provides following benefits:

- PoC services becomes available even in those locations where a wireless data network 126 is not available, but where a general purpose IP network 144 is available. This is particularly more useful in enhancing in-building coverage for the PoC service.
- By connecting over the IP network 144, the available IP bandwidth, quality and performance can be more streamlined and controlled since the IP network 144 (typically) has a greater capacity and throughput as compared to the wireless data network 126, which is more shared in nature.
- By utilizing the greater available bandwidth over the IP network 144, as compared to the wireless data network 126, it is possible to provide additional services (such as sharing large files) which otherwise is inefficient and costly on wireless data networks 126.

These and other aspects of the interworking solution are described in more detail below.

2.5 Management Layer Elements

As noted above, the Management Layer 104 is comprised of the following elements:

Element Management System (EMS) Server 116,
Lawful Intercept (LI) Server 118,
Web Group Provisioning (WGP) Server 122, and
Web Customer Service Representative (WCSR) Server 120.

These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.

Typically, it supports the following operations:
Create Subscriber account,
Update Subscriber account,
Delete Subscriber account,
Mobile number change command,
View Subscriber details (MDN, Group, Group members),
Manage Corporate Accounts,
Add CSR account,
Delete CSR account.

3 SYSTEM FUNCTIONS

The following sections describe various functions performed by each of the components of the system architecture.

3.1 PoC Service Layer 3.1.1 PoC Server

The PoC Server 112 controls PoC call sessions, including 1-1, Ad Hoc and Pre-Arranged PoC call sessions. The PoC Server 112 also controls Instant Personal Alerts.

The PoC Server 112 expects the PoC Clients 136 to setup "pre-established sessions" at the time of start up and use these sessions to make outgoing PoC calls. The PoC Server 112 also uses pre-established sessions to terminate incoming PoC calls to the PoC Clients 136. The PoC Clients 136 are setup in auto-answer mode by default. The use of pre-established sessions and auto-answer mode together allow for faster call setup for PoC call sessions.

The PoC Server 112 allocates and manages the media ports of the Media Servers 114 associated with each SIP INVITE dialog for pre-established sessions and controls the Media Servers 114 to dynamically associate these ports at run time for sending RTP packets during PoC call sessions. Media ports are assigned and tracked by the PoC Server 112 at the time of setting up pre-established sessions. The PoC Server 112 instructs the Media Server 114 to associate the media ports of various subscribers dynamically into a session when a PoC call is originated and this session is maintained for the duration of the call. The PoC Server 112 also controls the floor states of the various participants in a PoC call session by receiving indications from the Media Servers 114 and sending appropriate requests back to the Media Servers 114 to send MBCP messages to the participants in the PoC call. The Media Server 114 uses the media ports association and current talker information to send the RTP packets from the talker's media port onto the listeners' media ports.

In addition, the PoC Server 112 handles the incoming and outgoing Instant Personal Alerts (IPAs) by routing SIP MESSAGE requests to the PoC Clients 136 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the PoC Clients 136 as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from PoC Clients 136 are sent to the PoC Server 112, and the PoC Server 112 instructs the Media Server 114 appropriately. Based on these instructions, the Media Server 114 sends floor control messages to the PoC Clients 136 and sends the RTP packets received from the talker to all the listeners.

3.1.1 Presence Server

The Presence Server 110 accepts presence information published by PoC Clients 136, as well as availability information received from other entities. The Presence Server 110 keeps track of these presence states and sends notifications to various "watcher" applications whenever a presence state changes. The Presence Server 110 maintains separate subscriptions for each watcher and dynamically applies the presence authorization rules for each watcher independently.

The Presence Server 110 also accepts resource list subscriptions from the watchers, which identify one or more entities ("Presentities") whose presence should be monitored. The Presence Server 110 then aggregates all the presence information into one or more presence notifications transmitted to each watcher. This allows watchers to subscribe to large number of Presentities without putting strain on the network as well as client and server resources.

3.1.4 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.1.5 Gateway

The Gateway 142 performs interworking for the PoC service by communicating with the PoC Clients 136 via one or more IP networks 144 and/or wireless data networks 126.

The PoC Client 136 sets up one or more connections using the configured Fully Qualified Domain Name (FQDN), or absolute domain name, of the Gateway 142, which may be publicly exposed to the Internet 142. Secure transport protocols may (or may not) be used for the connections across the IP networks 144 and/or wireless data networks 126. For example, the PoC Clients 136 may use the Transport Layer Security (TLS) and/or Secure Sockets Layer (SSL) protocols for encrypting information transmitted over the connections between the PoC Client 136 and the Gateway 142.

In such an embodiment, all SIP signaling and voice data (RTP and RTCP) would be tunneled over the SSL/TLS connections between the PoC Client 136 and the Gateway 142. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

Consequently, the Gateway 142 may perform as an encryption/decryption off-loader that provides end-to-end encryption for all traffic transmitted to and from the PoC Client 136. Specifically, all of the traffic sent to the PoC Client 136 may be encrypted at the Gateway 142 and all the traffic received from the PoC Client 136 may be decrypted at the Gateway 142.

The Gateway 142 terminates the SSL/TLS connections and aggregates or dis-aggregates the PoC Client 136 traffic to the appropriate Servers 108, 110, 112, 114, 116, 118, 120 and 122. Specifically, the Gateway 142 acts as an intelligent traffic distributor for SIP signaling and RTP/RTCP traffic by forwarding the traffic to the appropriate Servers 108, 110, 112, 114, 116, 118, 120 and 122, depending on the message types and the availability of the Servers 108, 110, 112, 114, 116, 118, 120 and 122. Consequently, the Gateway 142 is a single point-of-contact for all traffic to and from the PoC Clients 136 at an IP transport layer via the IP networks 144 and/or wireless data networks 126.

Typically, the SSL/TLS connections are persisted and used for any bidirectional data transfer between the Gateway 142, or other Servers, and the PoC Clients 136. Thus, a PoC Client 136 maintains an "always-on" connection with the Gateway 142 by periodically sending "keep-alive" messages over the SSL/TLS connections.

The system also simplifies the use of the WiFi APs 146 and Firewalls 148 or other network appliances.

3.2 Management Layer 3.2.1 EMS Server

The EMS Server 116 is the central management entity in the system and includes the following modules:

A central application where all management business logic resides.

A web server for serving the network operator's internal users. A corresponding client provides a user interface for viewing fault, configuration, performance and security information.

A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.

Create Subscriber account,
Update Subscriber account,
Delete Subscriber account,
Mobile number change command,
Forced synchronization of a Subscriber,
Deactivate a Subscriber account,
Reactivate a Subscriber account,
View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:

Group management,
Contact management, and
Associations between corporations.

With regard to group management, the CAT of the WGP Server 122 includes the following operations:
- Create, Update, Delete and View Corporate Groups,
- Add, Update, Delete and View Members of a Corporate Group,
- Manage Subscribers,
- Activate and Deactivate a Corporate Subscriber,
- Change a Subscriber type from "Corporate" to "Corporate And Public", and vice versa,
- Restrict Availability, i.e., do not allow subscriber to change their presence status, and
- Manage number porting or name change via phone assignment.

With regard to contact management, the CAT of the WGP Server 122 includes the following operations:
- Phone list management,
- N×N Contact Add (e.g., N contacts may be members of N groups),
- Add, Update, Delete and View Contacts for a specific subscriber, and
- Export and Import contacts at both the subscriber and corporate level.

With regard to associations between corporations, the CAT of the WGP Server 122 includes the following operations:
- Corporate Associations Attributes,
- Association Name,
- Association ID,
- Association Mode (e.g., One-way, Two-way), and
- Restricted List.

Once the association is created and accepted, corporate administrators can create contacts and groups using the association policies. Administrators from other corporations can view the contacts, and may or may not have the capability to add, update or delete the contacts.
- Corporate ID associated per corporate subscriber,
- Central management of corporate subscribers, groups, and contacts,
- Intercorporate associations, including contacts and whitelists,
- Phone list management (e.g., N×N contact add),
- Restrict Availability, and
- Import and Export contacts at both the subscriber and corporate level.

Note that, if the association is deleted, then usually all intercorporate contacts and group members will be deleted.

3.3 PoC Client

The PoC Client 136 is an OMA-compatible client application executed on a handset 134. The following features are supported by the PoC Client 136:
- PoC Calls and Instant Personal Alert,
- Presence, and
- Contact and Group Management.

The PoC Client 136 includes a database module, a presence module, an XDM module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server 110 as a "watcher" of all contacts in the handset 134 and updates the user interface of the handset 134 whenever it receives a notification with such presence information.

The XDM module communicates with the XDM Server 108 for management of contacts and groups. The XDM module may subscribe with the XDM Server 108 to send and receive any changes to the contacts or group list, and updates the user interface of the handset 134 based on the notifications it receives from the XDM Server 108.

The client module provides the most important function of making and receiving PoC calls. To support PoC calls, the client module creates and maintains pre-established sessions with the PoC Server 112. The client module supports 1-1, Ad Hoc and Pre-Arranged PoC calls. The client module also supports sending and receiving Instant Personal Alerts (IPA).

4 STATE DIAGRAM FOR A POC CALL SESSION

Figure 2:
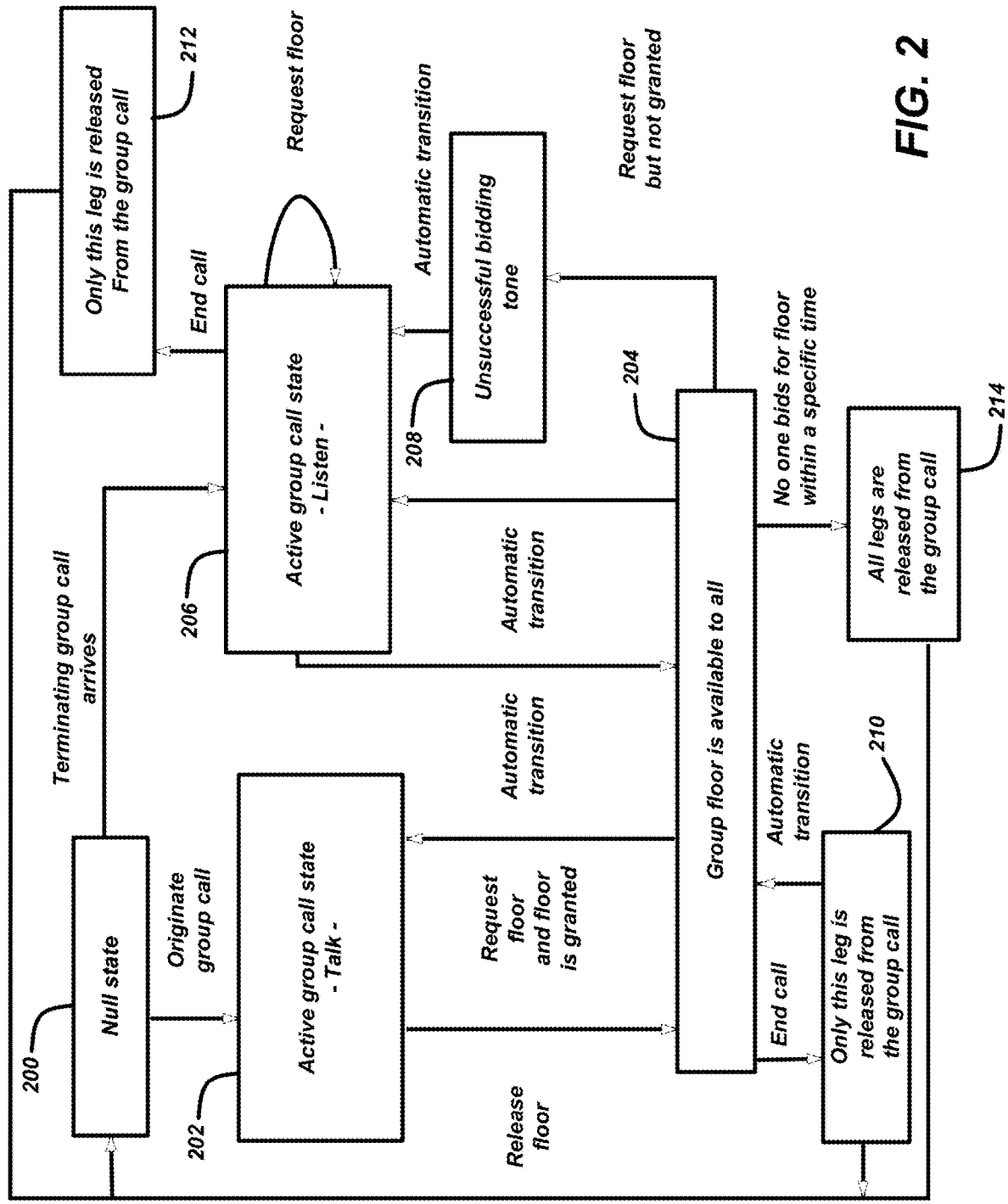
FIG. 2 is a state diagram that illustrates the operation of a PoC session according to one embodiment of the present invention.

FIG. 2 is a state diagram that illustrates the operation of a PoC call session according to one embodiment of the present invention.

State 200 represents a PoC Client 136 in a NULL state, i.e., the start of the logic. A transition out of this state is triggered by a user making a request to originate a PoC call, or by a request being made to terminate a PoC call at the handset 134. A request to originate a PoC call is normally made by pressing a PoC button, but may be initiated in this embodiment by dialing some sequence of one or more numbers on the handset 134 that are interpreted by the PoC Server 112, by pressing one or more other keys on the handset 134 that are interpreted by the PoC Server 112, by speaking one or more commands that are interpreted by the PoC Server 112, or by some other means.

State 202 represents the PoC Client 136 in an active group call state, having received a "floor grant" (permit to speak). In this state, the user receives a chirp tone that indicates that the user may start talking. The user responds by talking on the handset 134. The handset 134 uses the reverse traffic channel to send voice frames to the Media Server 114, and the Media Server 114 switches voice frames only in one direction, i.e., from talker to one or more listeners, which ensures the half-duplex operation required for a PoC call.

State 204 represents the group "floor" being available to all members of the group. When the talking user signals that the floor is released, the floor is available to all group members. The signal to release the floor is normally made by releasing the PoC button, but may be performed in this embodiment by voice activity detection, e.g., by not speaking for some time period (which is interpreted by the PoC Server 112 as a release command). All members of the group receive a "free floor" tone on their handset 134. A user who requests the floor first (in the "free-floor" state), for example, is granted the floor, wherein the system 100 sends a chirp tone to the successful user. The signal to request the floor is normally made by pressing the PoC button, but may be performed in this embodiment by voice activity detection, e.g., by speaking for some time period (which is interpreted by the PoC Server 112 as a request command).

State 206 represents the PoC Client 136 being in an active group call state. In this state, the user is listening to the group call. If a non-talking user requests the floor in the active group call state, the user does not receive any response from the system 100 and remains in the same functional state. As noted above, the signal to request the floor is normally made by pressing the PoC button, but may be performed in this embodiment by voice activity detection, e.g., by speaking for some time period (which is interpreted by the PoC Server 112 as a request command).

State 208 represents a user receiving an "unsuccessful bidding" tone on his handset 134, after the user has requested the floor, but was not granted the floor, of the group call. The user subsequently listens to the voice message of the talking user.

Non-talking users (including the talking user who must release the floor to make it available for others) can request the system 100 to end their respective call legs explicitly.

State 210 represents a terminating leg being released from the call after the user ends the call.

State 212 also represents a terminating leg being released from the call after the user ends the call.

State 214 represents all terminating legs being released from the call when no user makes a request for the within a specified time period, or after all users have ended their respective call legs.

5 MULTIPLEXING RTP STREAMS TO OPTIMIZE NETWORK RESOURCE USAGE FOR POC SERVICE

5.1.1 Overview

As noted above, the PoC system 100 provides various types of PoC call services, such as a 1-1 call, prearranged group call, chat group call and ad hoc group call. Stringent call setup time requirements and unique service usage patterns make a PoC call service very different from a traditional VoIP call service.

Group communication is the primary mode of operation for a substantial number of PT users. This category of users typically participate actively or passively (listening mode) in one or more group communication channels. This feature is referred to a "talk group scanning" in land mobile radio (LMR) parlance. This usage pattern is characterized by concurrent group communication activity, which is perceived by the user as interleaved media and/or voice bursts. The user may respond by requesting for the floor in a specific group call context and talk back, or the user may just passively listen to all group channels. This usage pattern is realized in the OMA PoC standard using chat group operation mode, in which the user joins multiple PoC chat group sessions and participates in all these sessions concurrently.

PoC chat group sessions are usually of very long duration, but actual communication activity during the session constitutes only a small portion of this time. In typical implementations of the OMA PoC standard, the PoC Client 136 uses a SIP INVITE dialog to setup an RTP session for participating in a PoC chat group session, and this RTP session is used exclusively for transmitting and receiving media associated with that chat group. Normally, PTT users participate in several such chat group sessions, and the PoC Clients 136 will therefore setup several concurrently active RTP sessions to serve such users.

Delivering multiple media streams simultaneously to PoC Clients 136 in this manner may strain network infrastructure. The problem is further exacerbated by the fact that chat group sessions tend to be active for a long duration. Setting up multiple media paths simultaneously with different application servers increases the cost of service delivery due to the network resource utilization for supporting multiple media paths.

Further, in most IP network 144 topologies, a significant cost is incurred in terms of latency and core network resource usage, such as NAT (network address translation) ports, SBC (session border controller) sessions, etc., when setting up an IP path between the PoC Client 136 and one or more servers. This is due to the fact that IP networks 144 are protected by different types of appliances, such as Firewalls 148, NAT appliances, SBCs, load balancers, etc. In such environments, it is necessary to build in traversal mechanisms using protocols such as STUN and TURN, use appropriate application protocols to open the required interfaces on the appliance. Setting up secure communication paths requires key exchange mechanisms and adds to the latency cost and consumes resources in network equipment used for SSL/TLS offloading. Significant savings can be realized by optimizing the number of communication paths required between the PoC Clients 136 and IP network 144 appliances.

5.1.2 Solution Overview

The solution described in this invention proposes to address the problems presented in previous section by multiplexing concurrent media streams comprised of, for example, voice messages, into a single RTP session or path. This is realized by a function called "Media Stream Multiplexer," hereinafter referred to as "MediaMux," implemented by the Media Server 114 Association of various application media streams to a common multiplexed RTP stream is achieved by issuing appropriate commands to a function called "MediaMux Controller," implemented by the PoC Server 112. The methods and apparatus required to realize this solution are also described herein.

5.1.2.1 Media Path Multiplexing

Figure 3:
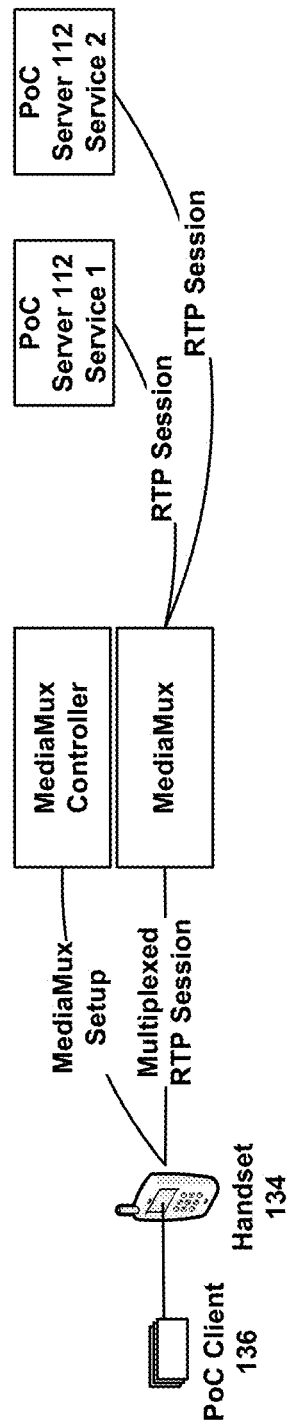
FIG. 3 is a schematic that illustrates media stream multiplexing according to one embodiment of the present invention.

FIG. 3 is a schematic that illustrates media stream multiplexing according to one embodiment of the present invention.

By using SIP Registrar and Proxy functions implemented in the Gateway 142, signaling paths are multiplexed easily in the sense that multiple application servers can deliver SIP messages over the same path to the PoC Client 136 as long as the PoC Client 136 maintains an active connection with the SIP Proxy. However, a similar multiplexing mechanism is not readily available for media streams. Instead of negotiating a separate RTP port for each media stream, the PoC system 100 provides a mechanism to deliver multiple media streams in a multiplexed manner using the same RTP path, which comprises the same RTP port. The Media Server 114 implements the MediaMux function, which enables several independent PoC media streams to be conveyed over the same RTP path. The RTP session can be setup using a pre-established session or an on-demand session. The PoC Server 112 implements the MediaMux Controller function, which is responsible for associating various PoC media streams to a common multiplexed RTP stream.

The single RTP path is assigned a unique identifier, and each of the plurality of the PoC call sessions is assigned a unique stream tag. The media streams are multiplexed and de-multiplexed using the unique stream tag assigned to each of the plurality of the PoC call sessions. The media streams may include RTP headers, wherein the unique stream tag is stored in a Contributing Source (CSRC) field in the RTP header. Alternatively, the media streams may comprise RTP packets, wherein the unique stream tag is stored in an extension header in the RTP packets.

5.1.2.2 Anchoring the PoC Client to the PoC Server

Implementing MediaMux requires that all sessions involving a PoC Client 136 be routed through the same PoC Server 112 instance and hence the PoC Client 136 has to be anchored to a particular instance of the PoC Server 112. PoC Client 136 anchoring is achieved using a "PoC User Affinity Group." Every subscriber is assigned a PoC User Affinity Group and these PoC User Affinity Groups are dynamically distributed across the PoC Server 112 instances.

In a distributed architecture, users who need to communicate with each other may end up having media sessions set up with different PoC Servers 112. Additional signaling is required to connect these users across different PoC Server 112 instances and this will result in additional latency, particularly in shared cloud infrastructure environments where the network is not likely to be specifically optimized for meeting the PoC call service requirements. For a PoC call service, which has to overcome RAN (radio access network) latencies and still meet the stringent sub-second call setup requirements, every millisecond counts and it is essential to optimize all communication paths to avoid extra hops. Towards this end, it is required to serve users who need to communicate with each other from the same PoC Server 112 so that the additional latency for the inter-server call setup is avoided. This is achieved by anchoring all users who belong to a PoC User Affinity Group to the same PoC Server 112. The PoC User Affinity Group aggregates a group of users who communicate with each other frequently and it is computed heuristically by analyzing the call patterns of all the users.

5.1.2.3 On-Demand Pre-Established Sessions for PoC Service

In order to use RTP stream multiplexing for optimized delivery of a PoC chat group service, it is necessary for the SIP INVITE dialog to be shared. This implies that dialog setup signaling should be decoupled from the service control signaling. Therefore, once the PoC Client 136 establishes an INVITE dialog, the active INVITE dialog is used to multiplex several concurrent calls through the same media path using the MediaMux.

Also, the INVITE dialog is not terminated as soon as the call is over. Depending on the intended usage of the dialog as a pre-established session or on-demand session, a configurable inactivity timer governs how long the single signaling session is maintained when there is no media stream activity in the single signaling session. The inactivity timer is set to a longer duration for achieving pre-established session semantics, while the inactivity timer is set to a shorter duration for achieving on-demand session semantics. If the INVITE dialog is terminated due to inactivity, a new INVITE dialog is established on the next call origination or termination activity.

This "on-demand pre-established session" mechanism allows the PoC system 100 to optimize the usage of network infrastructure by closing the sessions when there is no media activity. At the same time, it also facilitates fast call setup for active PoC service users by avoiding the need for setting up new RTP streams multiple times for active users.

5.2 System Description 5.2.1 Components

Figure 4:
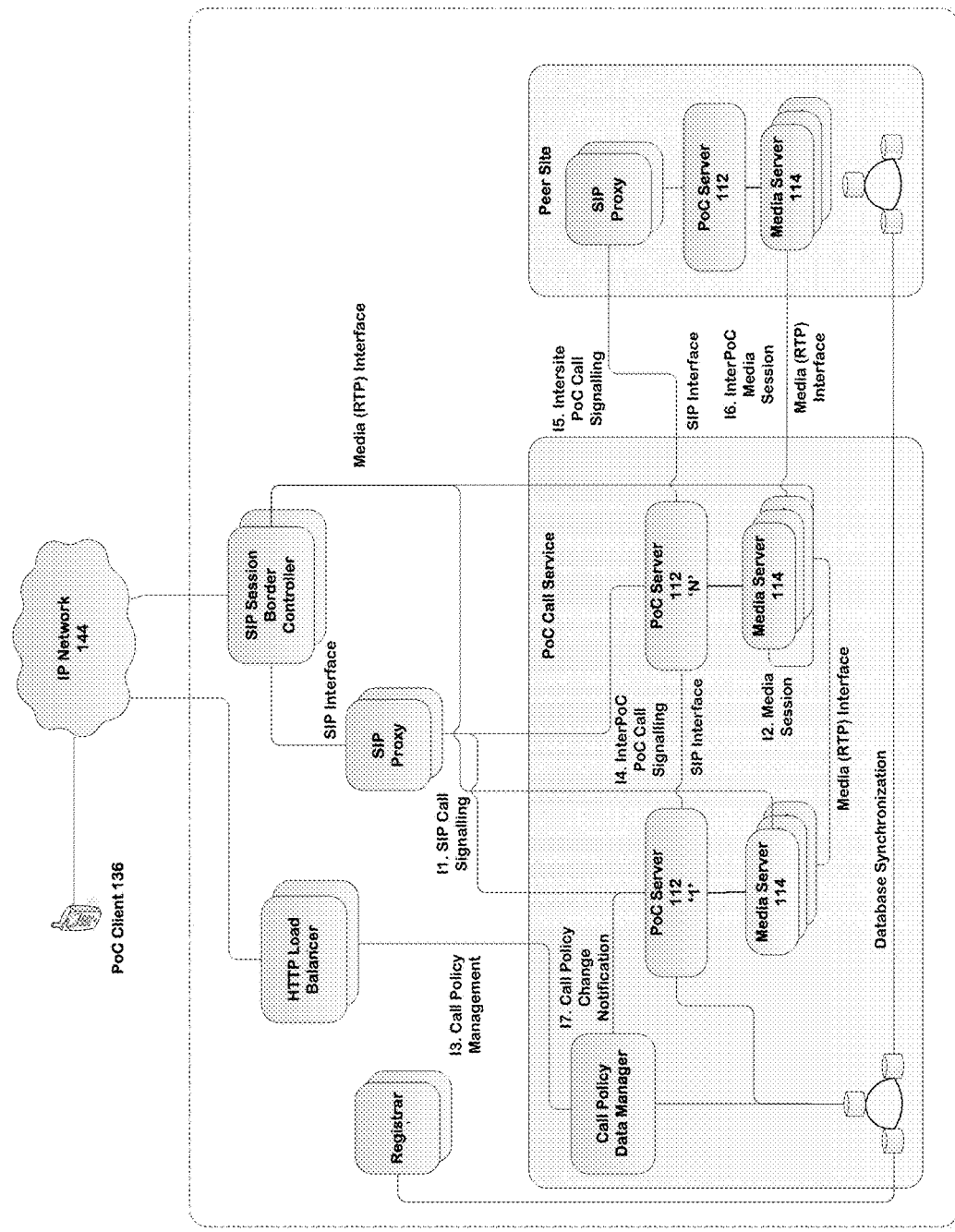
FIG. 4 is a schematic that illustrates the components used in the PoC call service with media stream multiplexing according to one embodiment of the present invention.

FIG. 4 is a schematic that illustrates the components used in the PoC call service with media stream multiplexing according to one embodiment of the present invention.

5.2.1.1 PoC Server

The PoC Server 112 manages the pre-established and on-demand sessions using a pool of Media Servers 114, and it implements the call state machines required for supporting different types of call services. It also serves as the MediaMux Controller and applies the user configured call management policies to control the MediaMux.

5.2.1.2 Media Server

When a PoC Server 112 is instantiated, it is provided with one or more Media Server 114 instances, which are exclusively under its control. In addition to relaying RTP streams between call participants, the Media Server 114 also handles MBCP based PTT control signaling over RTCP. The Media Server 114 also implements the MediaMux function and applies the media transmission policy as directed by the PoC Server 112.

5.2.1.3 Call Policy Data Manager

A Call Policy Data Manager is an HTTP service implemented by the Gateway 142 that is used by the PoC Client 136 to join/leave chat group sessions, configure media stream priorities, etc.

5.2.1.4 Registrar

A Registrar function implemented by the Gateway 142 maintains the PoC Client 136 connectivity information in a database that is shared with all services. Other services can use this data to route SIP messages to the PoC Client 136 via the correct SIP proxy instance. The Registrar also tracks the status of the proxy elements and identifies and/or recovers stale PoC Client 136 sessions connections in the event of a proxy element failure.

The PoC call service uses the data provided by the SIP Registrar for the following purposes:

1. For subscribers being serviced from the local site, the PoC call service uses the SIP registration data to identity the SIP proxy server to which the subscriber is currently connected and routes the SIP messages through that proxy when initiating call session towards that subscriber.

2. In a multi-site deployment, the PoC call service uses the SIP registration data to identify the site to which the subscriber is currently connected when it needs to make inter-site calls.

5.2.1.5 SIP Proxy

A SIP Proxy function implemented by the Gateway 142 routes the SIP traffic to the corresponding service (e.g., call, presence, etc.) and serves as the SIP load balancer. It also offloads the PoC Client 136 connection management from the backend services and enables all services to reach the PoC Client 136 through a common connection.

The PoC call service uses the SIP Proxy for sending SIP messages towards the PoC Client 136 when initiating new on-demand call sessions and for reaching PoC Servers 112 in peer deployment sites.

5.2.1.6 SIP Session Border Controller

All traffic entering into the PoC system 100 from IMS (IP Multimedia Subsystem) comes in via a SIP Session Border Controller (SBC) function implemented by the Gateway 142. The SIP SBC function provides the SIP ALG and Media NAT functions.

5.2.1.7 HTTP Load Balancer

All HTTP traffic related to the PoC Client 136 data management is received by the PoC system 100 via an HTTP proxy function implemented by the Gateway 142. This includes the requests sent from the PoC Client 136 to the Call Policy Data Manager.

5.2.2 Interfaces

The interfaces of the PoC call service shown in FIG. 4 are enumerated in the following table.

| Interface | Description |
| --- | --- |
| I₁ - SIP Call Signaling | The SIP Call Signaling interface for PoC call service is used for the following operations:<br>1. PoC Client 136 initiated and PoC Server 112 initiated INVITE dialog setup, refresh and teardown,<br>2. Call setup signaling for 1-1 call, pre-arranged group call and ad-hoc group call, and<br>3. InstaPoC signaling. |
| I₂ - Media Session | The Media Session interface is used for multiplexed media stream transmission between the PoC Client 136 and the Media Server 114. |
| I₃ - Call Policy Management | The Call Policy Management interface is an HTTP based function that allows the PoC Client 136 to manage chat group subscriptions (i.e. join/leave) and chat group priority; i.e., edit talk group scan list. |
| I₄ - InterPoC Call Signaling | The InterPoC Call Signaling interface is used for on-demand call setup across PoC Servers 112 within the same deployment site. |
| I₅ - Intersite Call Signaling | The Intersite Call Signaling interface is used for on-demand call setup across PoC Servers 112 across different deployment sites. Note the subtle difference between the InterPoC and Intersite Call Signaling interfaces. Intersite calls are always routed via the peer site's SIP Proxy, whereas InterPoC calls take place directly between peer PoC Servers 112 within the same deployment site. |
| I₆ - InterPoC Media Session | The InterPoC Media Session interface is used for transmitting media streams and PTT floor control events across PoC Servers 112 for the calls setup using the I₄ and I₅ interfaces. |
| I₇ - Call Policy Change Notification | The Call Policy Change Notification is an internal interface used to notify any changes to call policy effected by the user to PoC Server 112 that is currently managing that user's active INVITE dialog. |

5.2.3 State Management and Fault Tolerance

The following states are maintained by the PoC call service:

1. SIP INVITE dialog state for per-established and on-demand sessions.
2. Call policy settings.
3. PoC User Affinity Group ownership.

5.2.3.1 SIP INVITE Dialog

The SIP INVITE dialog is managed locally within each PoC Server 112. When a PoC Server 112 instance terminates, all SIP INVITE dialogs currently active by that PoC Server 112 instance are lost. No specific action is needed for recovering from this situation as is apparent from the self-healing logic described in the previous section.

A SIP INVITE dialog may also be invalidated due to media session failure. A media session is lost when there is a Media Server 114 instance or Media Gateway Server instance failure. The PoC Server 112 tracks of these media related component failure events and invalidates the impacted SIP INVITE dialogs when these events occur. Subsequently, if the PoC Server 112 finds that there is no active INVITE dialog when trying to initiate a call towards a PoC Client 136, it shall trigger an on-demand INVITE session.

5.2.3.2 Call Policy Setting Data

Call policy settings data is persisted in a shared database and all updates to this data are dealt with by Call Policy Data Manager at a transaction level. Therefore, failure of a Call Policy Data Manager instance does not have any impact beyond the timeouts of currently active transactions.

5.2.3.3 PoC User Affinity Group Ownership

PoC User Affinity Groups are the key to the resilience of the PoC call service. When a PoC Server 112 takes over the ownership of a PoC User Affinity Group, it is advertised to all peer PoC Servers 112 by means of an entry in a shared database. When a PoC Server 112 terminates, the PoC User Affinity Groups served by that PoC Server 112 are reassigned to other available PoC Server 112 instances.

5.3 Service Description and Message Flows 5.3.1 SIP INVITE Dialog and Call Signaling An INVITE dialog is not necessarily limited to serving a single PoC call. An active INVITE dialog may be used to multiplex several concurrent calls through the same media path as described below in the MediaMux section. Also, the INVITE dialog is not terminated as soon as the call is over. A configurable inactivity timer governs how long the dialog is retained when there is no media activity in that session.

Figure 5:
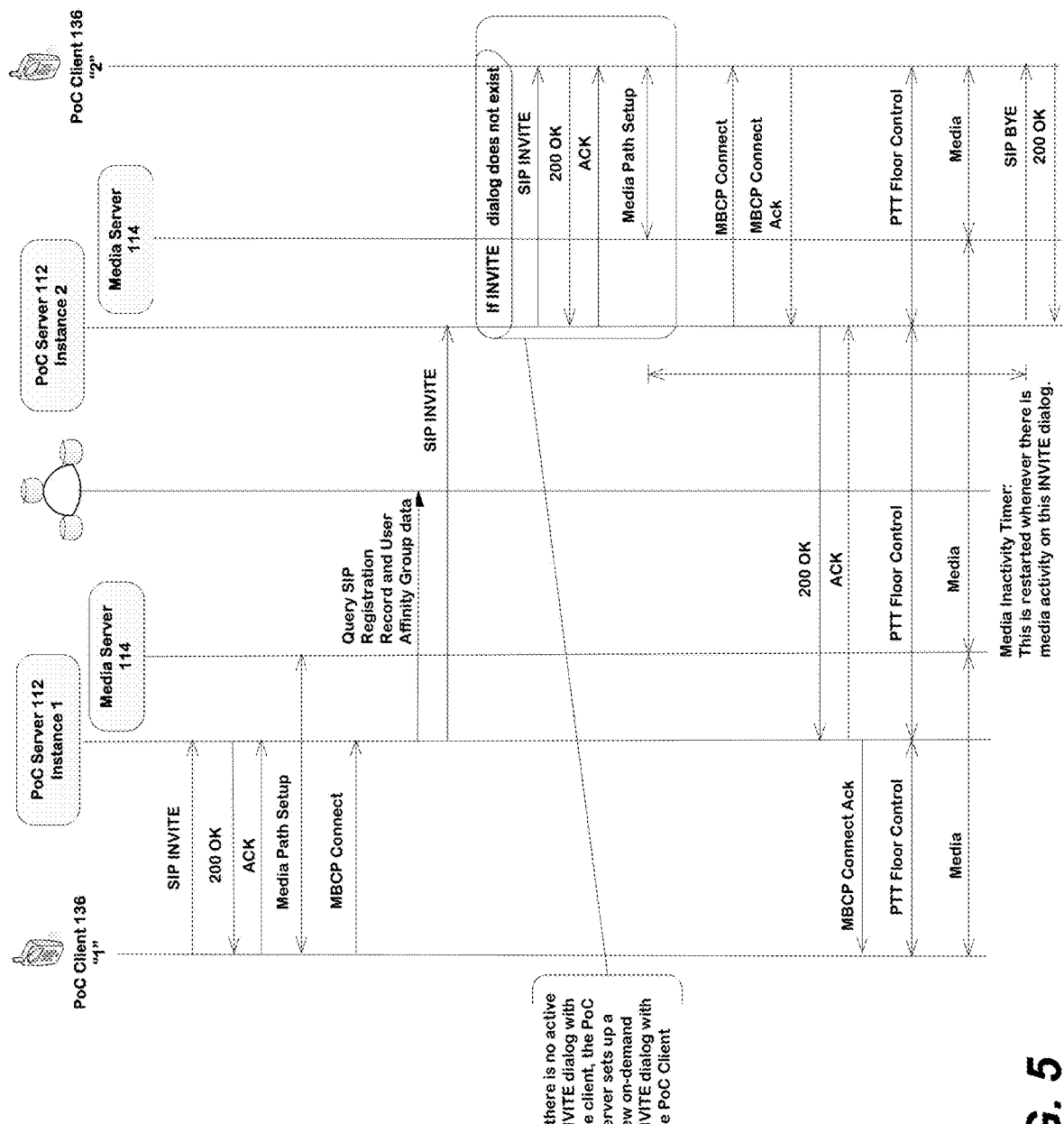
FIG. 5 is a call flow diagram that illustrates a media stream multiplexer setup according to one embodiment of the present invention.

FIG. 5 is a call flow diagram that illustrates the usage of the SIP INVITE dialog for MediaMux. The diagram illustrates the following aspects of the PoC call flow:

- INVITE dialog setup from the originating PoC Client 136 "1".
- INVITE dialog setup towards the terminating PoC Client 136 "2".
- Since an INVITE dialog can serve multiple calls, successful setup of the INVITE dialog on both ends by itself does not complete the call setup. Additional signaling is performed for call setup separately using MBCP protocol as specified in OMA PoC standards.
- Use of SIP Registration data and PoC User Affinity Group data by the originating PoC Server 112 to identify which PoC Server 112 is responsible for handling the terminating leg.
- Even though the terminating leg is show as being handled by a separate PoC Server 112 in this diagram, it is possible that the originating PoC Server 112 is itself responsible for the terminating leg as well. It is also possible that the terminating PoC Client 136 is currently registered with a different site, in which case the originating PoC Server 112 will route the terminating leg through that site.

Note that the SIP Proxy and network interface layer components have been omitted from this call flow diagram for brevity.

5.3.2 Group Calls

Signaling for a PoC group call is very similar to the 1-1 call signaling. As in the case of a basic 1-1 call described in the previous section, the PoC group call signaling is also performed using MBCP and the existing INVITE dialog is reused for originating and/or terminating group calls. One or more group calls can be multiplexed through the same INVITE dialog, as explained further in Section 5.3.4 MediaMux Control below.

5.3.3 Determination of INVITE Dialog Inactivity Timer Duration

The inactivity timer's duration for the INVITE dialog used for MediaMux can be determined so as to maximize the probability of the INVITE dialog getting reused for MediaMux. This is achieved considering the following factors:

Heuristic computation based on the user's call activity history, such that the duration is assigned larger values when the user is more likely to make or receive a PoC call.

Keep the INVITE dialog active during the periods when the user is most likely to make or receive a call.

Network resource utilization, such that the duration is inversely proportionate to the network resource utilization:

Keep the inactivity timer shorter as the system reaches closer to the budgeted capacity limit for the PoC call service.

5.3.4 MediaMux Control 5.3.4.1 MediaMux Setup

Figure 6:
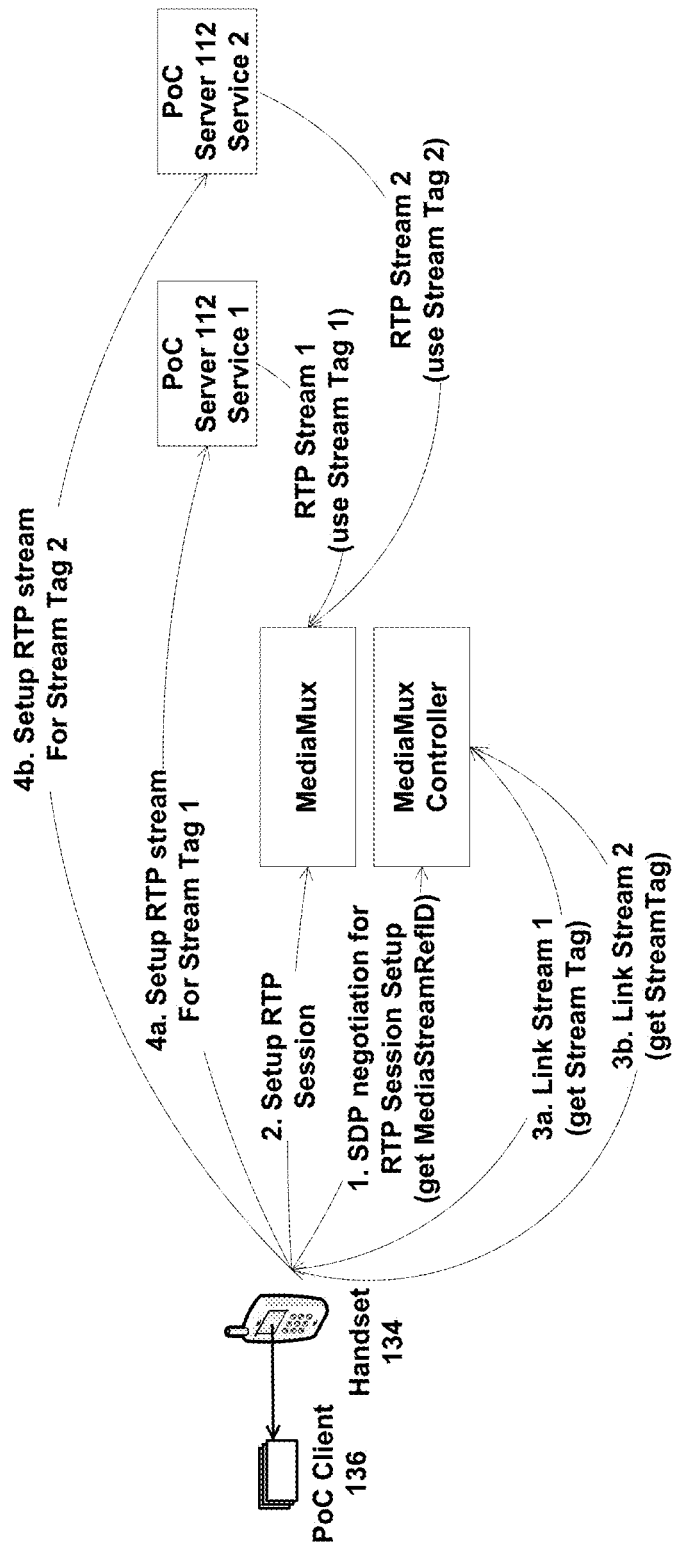
FIG. 6 is a schematic that illustrates a media stream multiplexer setup according to one embodiment of the present invention.

FIG. 6 is a schematic that illustrates a MediaMux setup according to one embodiment of the present invention.

The PoC Client 136 uses the MediaMux Controller to setup a multiplexed RTP stream and associate it with various application RTP streams.

The MediaMux setup involves the following steps:

1. Negotiate RTP session parameters with MediaMux using the SDP protocol. As part of this negotiation, the PoC Client 136 establishes a MediaStreamRefID to uniquely identify the RTP session with MediaMux.

2. Setup an RTP session between the PoC Client 136 and MediaMux.
   a. When the PoC Client 136 establishes an RTP session with MediaMux, it provides a unique MediaStreamRefID, which can be used to address the RTP session setup by the PoC Client 136.

3. Link the application RTP stream to MediaMux.
   a. For each application RTP stream, a unique "Stream Tag" is created. In order to link an application RTP stream to the RTP stream of the PoC Client 136 on MediaMux, the MediaStreamRefID and the Stream Tag is provided to the application server, which in turn uses this reference ID to connect to the appropriate MediaMux and create a media path linkage to the existing RTP session of the PoC Client 136 on the MediaMux. In this manner, multiple RTP streams from various application servers can share the RTP session of the PoC Client 136 on the MediaMux to transmit and receive their respective RTP streams.
   b. The PoC Client 136 configures transmission control policy parameters such as priority for each stream.

4. Media stream authorization.
   a. The (MediaStreamRefID, Stream Tag) tuple serves as the authorization token for the application server media stream. MediaMux ignores and/or rejects unauthorized media streams that are not negotiated and setup a priori. The (MediaStreamRefID, Stream Tag) tuple associations that are in step 3 above are conveyed to the respective application server instances. This triggers the application server to setup an RTP session with MediaMux to which the PoC Client 136 is connected, instead of setting up the RTP session with the PoC Client 136 directly.

5.3.4.2 Media Transmission Through MediaMux

When the PoC Client 136 is transmitting multiple media streams, it identifies each stream with the corresponding Stream Tag. This enables the MediaMux to de-multiplex the stream and relay it the corresponding application server. Similarly, when relaying media received from application servers to the PoC Client 136, MediaMux tags each stream with its corresponding Stream Tag. This enables the PoC Client 136 to de-multiplex the streams.

MediaMux applies media transmission control policy that dictates the media transmission strategy. Various transmission strategies can be applied depending on the nature of the application and the characteristics of the interface between the PoC Client 136 and MediaMux.

3.4.3 Methods for Incorporating Stream Tag into RTP Packets 5.3.4.3.1 Method 1: Use CSRC Field in the RTP Header For multiplexing RTP streams belonging to different PoC call sessions, the Contributing Source (CSRC) field in the RTP header is used. Specifically, the Stream Tag is incorporated into RTP packet using the CSRC field. The CSRC field is an optional RTP header field that is intended to be used to identify the set of actual contributing sources that were used by the media mixer to generate the transmitted stream. The recipient PoC Client 136 can use the CSRC field provided by the Media Server 114 to de-multiplex the media stream and associate it with the actual PoC call session. This usage of CSRC field is very closely aligned with the standard usage of this field and hence it does not interfere with the logic of other network elements in the path. In particular, ROHC compression used in the radio bearer in LTE networks should work seamlessly with this media multiplexing protocol.

5.3.4.3.2 Method 2: Use the RTP Extension Header

The RTP protocol allows for extension headers to be defined for specific protocols. Application specific extension headers may be added to indicate the Stream Tag in RTP packets. This method will be applicable when RTP multiplexing is used for services such as audio conference bridges where the CSRC field may already be in use.

5.3.4.4 Multiplexed Media Transmission Strategies

MediaMux implements the following strategies for multiplexing.

Media burst interleaving:
  In the case of a PoC call, the start and end of a media burst is clearly demarcated. This information is used to interleave media bursts from different streams in a non-overlapping manner.
  By using a short inactivity guard timer in between media switching, user perception of these transitions will be smoother and it would replicate the LMR-like user experience where the user perceives it as automatic transitions between various radio channels.

Priority based stream selection:
  Relay only the higher priority stream when there is simultaneous transmission. Talk burst interleaving is applied within the same priority group. Lower priority streams may be pre-empted when there is activity on the higher priority stream.

First come, first served (FCFS):
  Relay all packets to the PoC Client 136 in the order in which they are received from the application servers. This strategy is useful when the PoC Client 136 is capable processing multiple media streams in parallel. One example of a PoC Client 136 for which this strategy is most applicable is a dispatch console, which plays out or records all media streams simultaneously.

5.3.4.5 QoS Considerations

If different bearer QoS needs to be applied for various applications, they should not be multiplexed into the same RTP stream. A separate RTP stream needs to be setup for each QoS specific bearer.

5.3.5 Usage of MediaMux for PoC Chat Group Service

Figure 7:
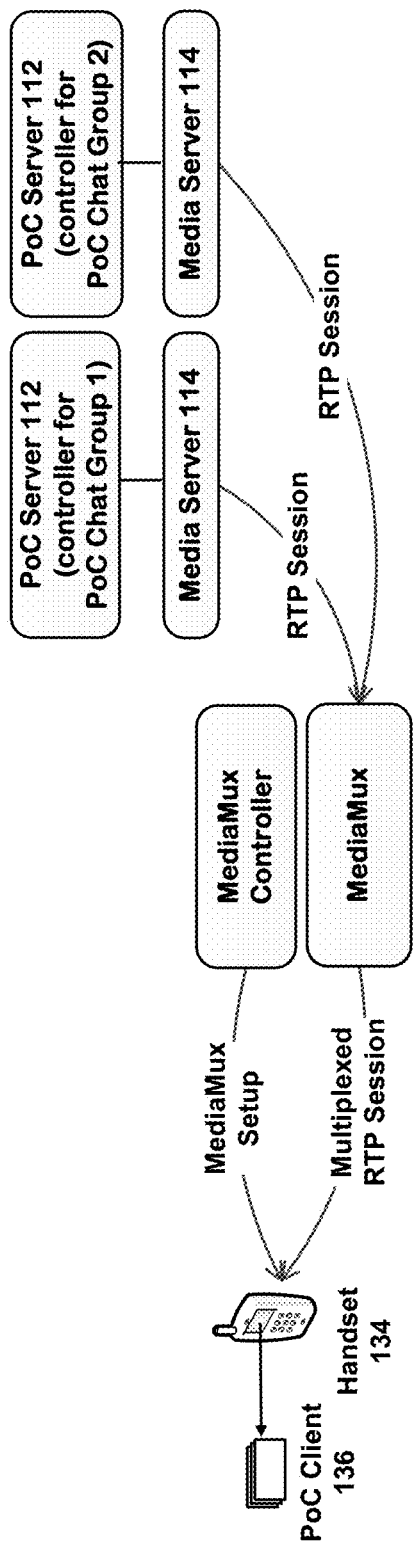
FIG. 7 is a schematic that illustrates a media stream multiplexer and controller performing a PoC chat group service according to one embodiment of the present invention.

As noted above, the PoC Server 112 serves as the MediaMux Controller and the Media Server 114 implements the MediaMux function. This is further illustrated in the schematic of FIG. 7, which shows the MediaMux and MediaMux Controller for the PoC chat group service.

Figure 8:
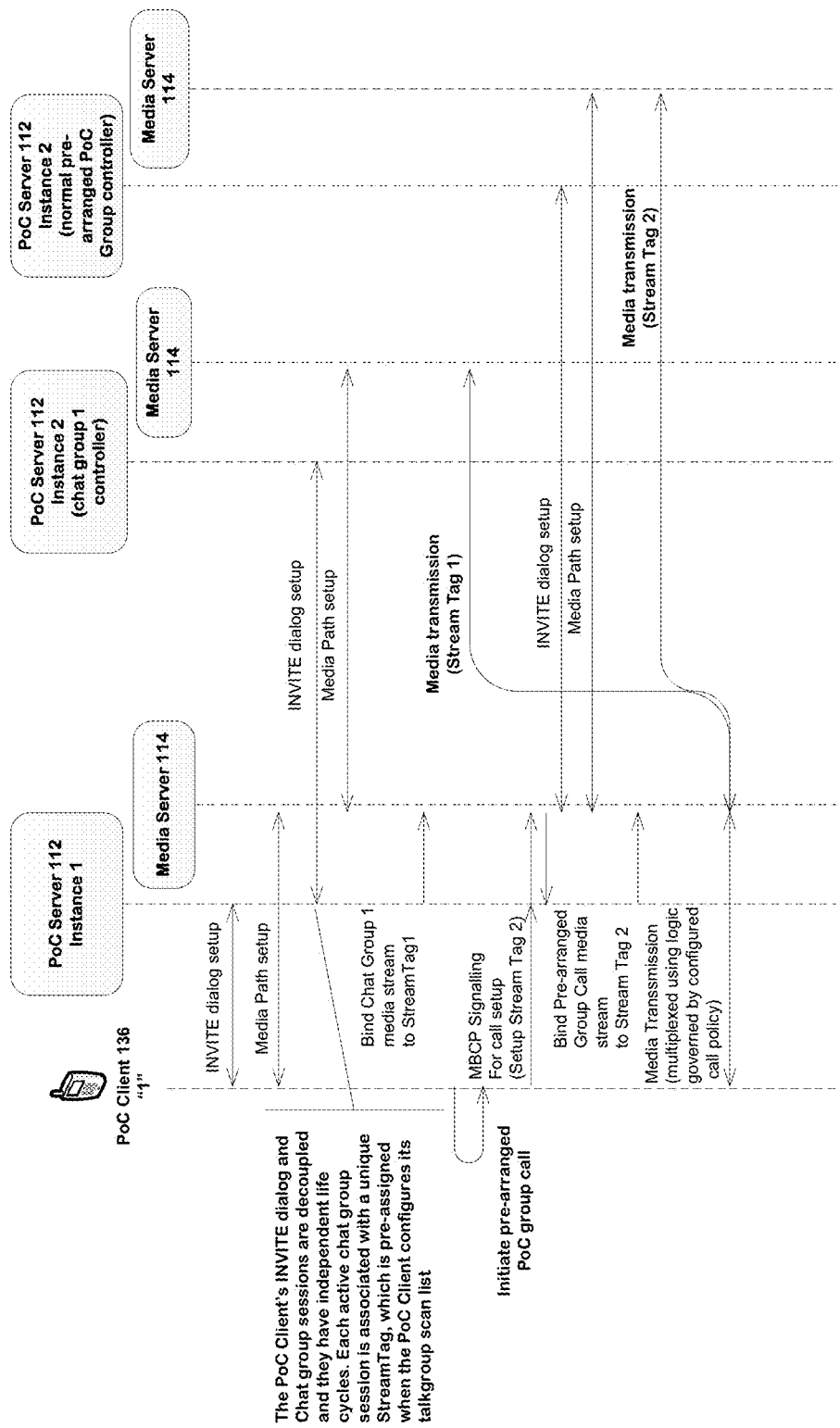
FIG. 8 is a call flow diagram that illustrates the signaling method for the PoC chat group service according to one embodiment of the present invention.

This structure enables the PoC Clients 136 to use the INVITE dialog with the PoC Server 112 to transmit and/or receive multiple media streams concurrently as illustrated in the call flow diagram of FIG. 8, which shows the signaling method for the PoC chat group service.

The signaling method for the PoC chat group service involves the following steps:

- Using INVITE dialog, the PoC Clients 136 setup a RTP session with the MediaMux. All calls (both originating and terminating) involving this PoC Client 136 will now be routed through the INVITE dialog as long as this INVITE dialog is active.
- MediaMux then applies the call policy to multiplex multiple media streams from different controlling PoC Servers 112 into the RTP session setup by the participating PoC Client 136.
- All RTP and RTCP packets flowing through between the MediaMux and the participating PoC Client 136 are identified by the Stream Tag. This enables both the PoC Client 136 and the Media Server 114 to de-multiplex the media and PTT floor control streams.
- A unique Stream Tag is created to identify each media stream associated flowing through the INVITE dialog. Each group in the talk group scan list created by the PoC Client 136 is assigned a unique stream tag. For other group calls pertaining to the groups not present in the talk group scan list, a Stream Tag is assigned dynamically at the time of call setup.

5.3.6 Alternate MediaMux Setup Signaling Methods for the PoC Chat Group Service 5.3.6.1 Alternate Method #1

Figure 9:
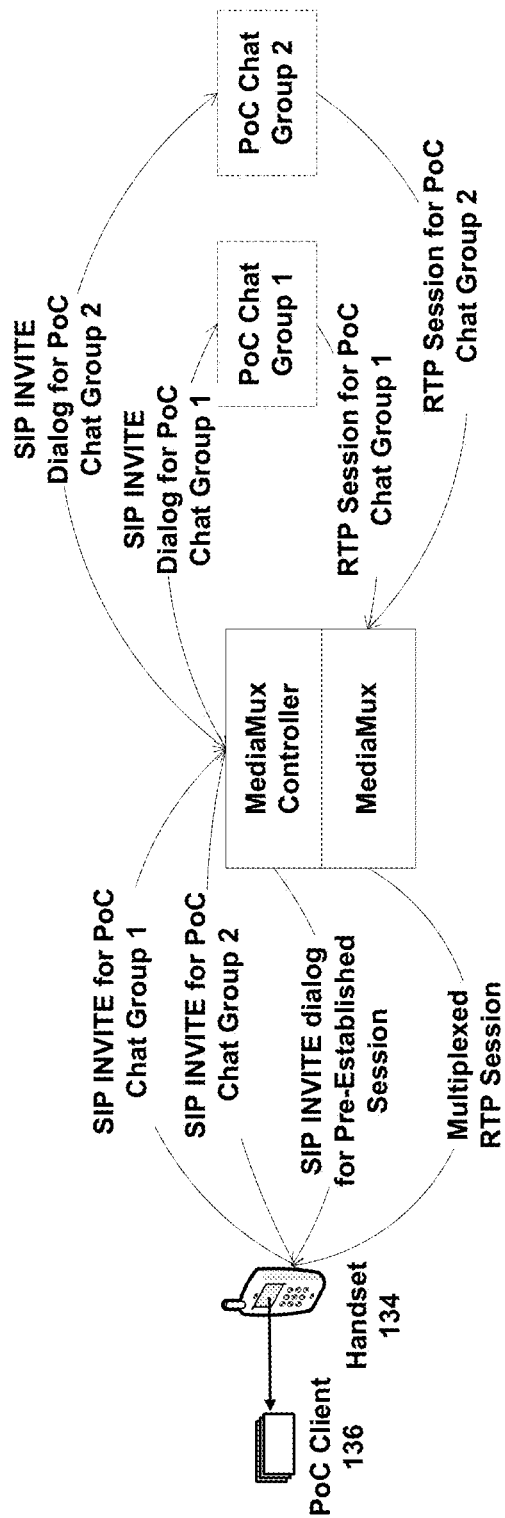
FIG. 9 is a schematic that illustrates a first method for a media stream multiplexer setup for the PoC chat group service according to one embodiment of the present invention.

FIG. 9 is a schematic that shows an alternate method #1 for MediaMux setup for the PoC chat group service.

In this method, in order to join a PoC Chat Group, the PoC Client 136 sends a SIP INVITE request to the PoC Server 112. The PoC Server 112 configures a new MediaMux stream and sets up a new SIP INVITE dialog with the PoC Server 112 for the PoC Chat Group.

The MediaMux stream information is passed to the PoC Server 112 for the PoC Chat Group, and this information is used to associate the new RTP stream between the Media Server 114 and the PoC Server 112 for the PoC Chat Group to the PoC Clients 136 pre-established session.

5.3.6.2 Alternate Method #2

Figure 10:
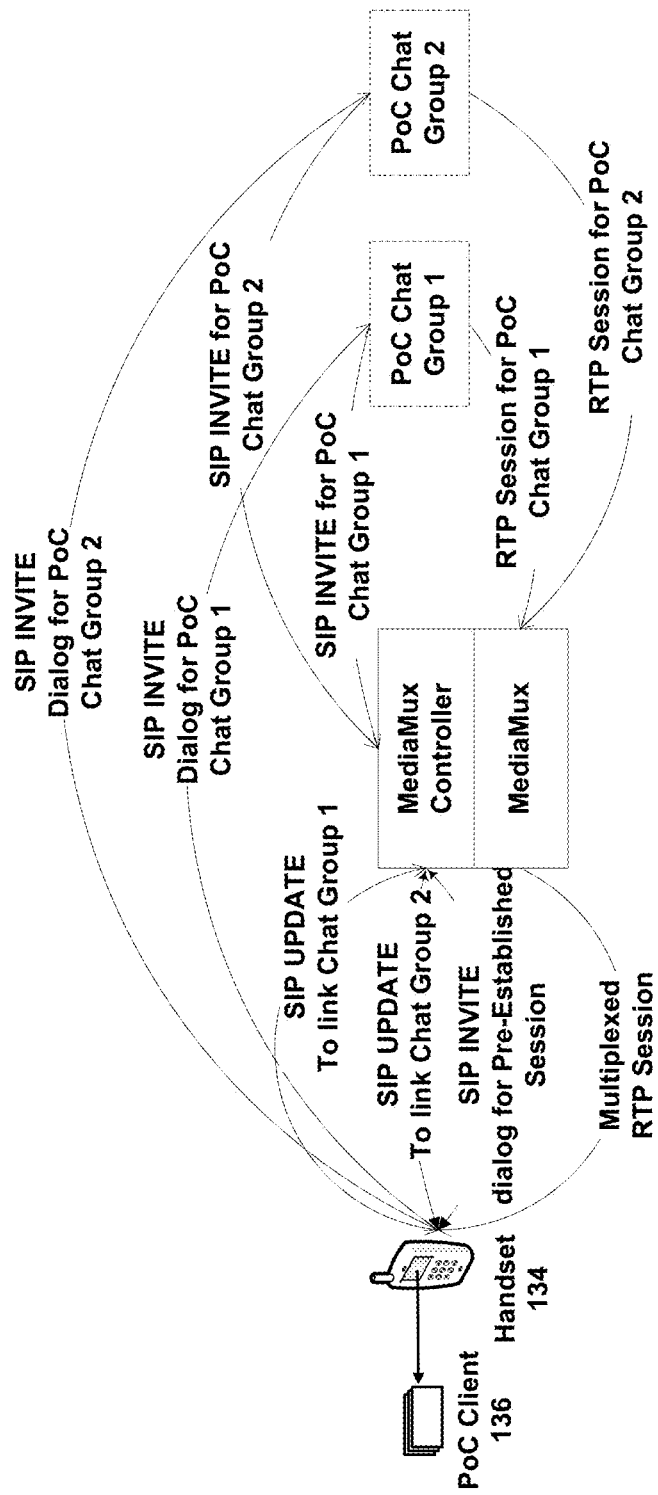
FIG. 10 is a schematic that illustrates a second method for a media stream multiplexer setup for the PoC chat group service according to one embodiment of the present invention.

FIG. 10 is a schematic that shows an alternate method #2 for MediaMux setup for the PoC chat group service.

In this method, in order to join a PoC Chat Group, the PoC Client 136 first uses the SIP UPDATE method to configure a new MediaMux stream and obtain the Stream Tag corresponding to the new RTP stream.

The PoC Client 136 then directly sets up the SIP INVITE dialog with the PoC Server 112 for the PoC Chat Group and provides the MediaMux stream identifier information in the SDP. The PoC Server 112 for the PoC Chat Group uses this information to setup a new RTP session with the PoC Server 112 and associate its RTP stream with the PoC Client's 136 pre-established session.

5.3.6.3 Alternate Method #3

Figure 11:
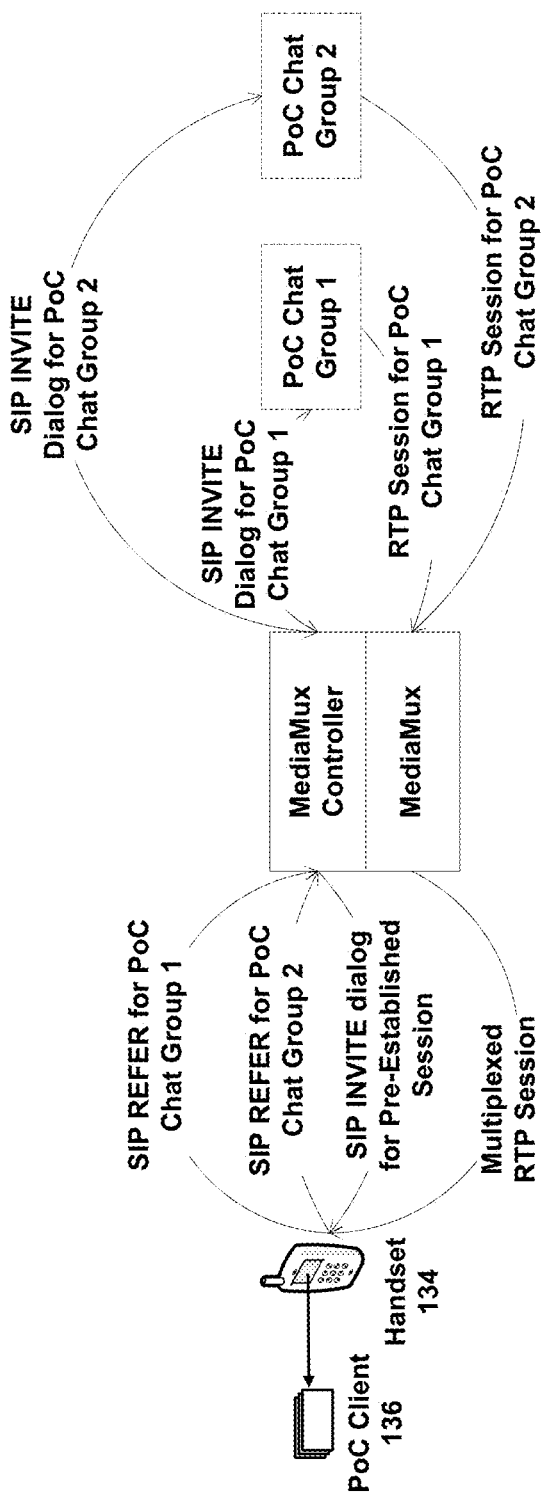
FIG. 11 is a schematic that illustrates a third method for a media stream multiplexer setup for the PoC chat group service according to one embodiment of the present invention.

FIG. 11 is a schematic that shows an alternate method #3 for MediaMux setup for the PoC chat group service. This method is very similar to alternate method #1.

In this method, the PoC Client 136 makes use of SIP REFER method to setup a new PoC Chat Group, instead of a SIP INVITE to join a PoC Chat Group 5.3.7 Call Policy Data Management Call policy settings that govern the media multiplexing logic are controlled by the PoC Client 136 through the Call Policy Data Management interface. Default policy is set provided based on the user's profile assigned by the provisioning system. the PoC Client 136 may use the HTTP REST based APIs provided by the Call Policy Data Manager Component to customize the policy. In particular, the PoC Client 136 can dynamically set the group priorities as part of the 'talk group scanning' feature to control which group takes precedence when there is concurrent group voice activity in multiple groups.

6 CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing communications services in a communications network, the system comprising:
   one or more servers interfacing with the communications network to provide communications services for a plurality of mobile units, wherein the communications services include two-way half duplex voice calls comprising Push-To-Talk (PTT) call sessions;
   wherein the one or more servers and the plurality of mobile units communicate with each other using control messages within the communications network;
   wherein the one or more servers multiplexes different media streams of a plurality of concurrent PTT call sessions into a multiplexed media stream; and
   wherein the one or more servers delivers the multiplexed media stream using a single path to a first mobile unit of the plurality of mobile units, the single path comprising a Realtime Transport Protocol (RTP) session established between the one or more servers and the first mobile unit, wherein the single path is assigned a unique identifier, and wherein each of the plurality of the concurrent PTT call sessions is assigned a unique tag associated with the unique identifier, wherein a first unique tag is transmitted with a first media stream of a first PTT call session of the plurality of concurrent PTT call sessions, and wherein the first unique tag is used to de-multiplex the first media stream for the first PTT call session from the multiplexed media stream, wherein the first media stream comprises a RTP header, and wherein the first unique tag is stored in a Contributing Source (CSRC) field in the RTP header, the first mobile unit being a participant in each of the plurality of concurrent PTT call sessions.

2. The system of claim 1, wherein the single path comprises a single port through which the multiplexed media stream is conveyed.

3. The system of claim 1, wherein the first media stream comprises Realtime Transport Protocol (RTP) packets, and wherein the first unique tag is stored in an extension header in the RTP packets.

4. The system of claim 1, wherein the plurality of concurrent PTT call sessions are managed using a single signaling session for controlling the single path.

5. The system of claim 1, wherein the one or more servers multiplexes the different media streams of a plurality of concurrent PTT call sessions into a multiplexed media stream by interleaving media bursts from the different media streams in a non-overlapping manner.

6. The system of claim 1, wherein the one or more servers multiplexes the different media streams of a plurality of concurrent PTT call sessions into a multiplexed media stream by priority-based media stream selection procedure, wherein the priority-based media stream selection procedure comprises transmitting a first media stream of the different media streams before a second media stream of the different media streams, the first media stream having a higher priority than the second media stream.

7. The system of claim 1, wherein the one or more servers multiplexes the different media streams of a plurality of concurrent PTT call sessions into a multiplexed media stream by transmitting the different media streams on a first-come-first-served basis.

8. The system of claim 1, wherein the first mobile unit is anchored to a first server of the one or more the servers.

9. The system of claim 2, wherein one of the servers manages the plurality of concurrent PTT call sessions by acting as an arbitrator for each of the plurality of concurrent PTT call sessions and by controlling transmission of different control messages and the different media streams of each of the plurality of concurrent PTT call sessions.

10. The system of claim 4, wherein a Session Initiation Protocol (SIP) INVITE dialog is used to implement the single signaling session.

11. The system of claim 4, wherein a configurable inactivity timer governs how long the single signaling session is retained when no media stream activity is transmitted over the single path.

12. The system of claim 8, wherein the first mobile unit is aggregated with one or more second mobile units in an affinity group, and wherein the system anchors the first mobile unit and the one or more second mobile units belonging to the affinity group to the first server.

13. The system of claim 11, wherein the configurable inactivity timer is set to a first duration for achieving pre-established session semantics, wherein the configurable inactivity timer is set to a second duration for achieving on-demand session semantics, and wherein the first duration is longer than the second duration.

14. The system of claim 11, wherein a duration of the configurable inactivity timer is determined by heuristic computations based on a call history of the first mobile unit, wherein the duration is assigned a larger value when the first mobile unit is more likely to participate in a PTT call session.

15. The system of claim 11, wherein a duration of the configurable inactivity timer is determined by network resource utilization within the communications network, and wherein the duration is inversely proportional to the network resource utilization.

16. The system of claim 12, wherein the first mobile unit communicates more often with the one or more second mobile units than one or more third mobile units, and wherein the first mobile unit is not aggregated with the one or more third mobile units in the affinity group.

17. The system of claim 12, wherein the system heuristically selects the one or more second mobile units to aggregate with the first mobile unit in the affinity group based on a call history of the first mobile unit, a call history of the one or more second mobile units, or a combination thereof.

18. method of providing communications services in a communications network, the method comprising:
    interfacing, by one or more servers, with the communications network to provide communications services for a plurality of mobile units, wherein the communications services include two-way half duplex voice calls comprising Push-To-Talk (PTT) call sessions;
    multiplexing, by the one or more servers, different media streams of a plurality of concurrent PTT call sessions into a multiplexed media stream; and
    delivering, by the one or more servers, the multiplexed media stream using a single path to a first mobile unit of the plurality of mobile units, the single path comprising a Realtime Transport Protocol (RTP) session established between the one or more servers and the first mobile unit, wherein the single path is assigned a unique identifier, and wherein each of the plurality of the concurrent PTT call sessions is assigned a unique tag associated with the unique identifier, wherein a first unique tag is transmitted with a first media stream of a first PTT call session of the plurality of concurrent PTT call sessions, and wherein the first unique tag is used to de-multiplex the first media stream for the first PTT call session from the multiplexed media stream, wherein the first media stream comprises a RTP header, and wherein the first unique tag is stored in a Contributing Source (CSRC) field in the RTP header, the first mobile unit being a participant in each of the plurality of concurrent PTT call sessions.

* * * * *